United States Patent
Kim et al.

(10) Patent No.: US 10,029,723 B2
(45) Date of Patent: Jul. 24, 2018

(54) INPUT SYSTEM DISPOSED IN STEERING WHEEL AND VEHICLE INCLUDING THE SAME

(71) Applicant: LG ELECTRONICS INC., Seoul (KR)

(72) Inventors: Hyongguk Kim, Seoul (KR); Yongbeom Ma, Seoul (KR); Jaekul Lee, Seoul (KR); Mihwa Chang, Seoul (KR); Moonkil Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 14/728,013

(22) Filed: Jun. 2, 2015

(65) Prior Publication Data
US 2015/0344059 A1    Dec. 3, 2015

(30) Foreign Application Priority Data
Jun. 3, 2014    (KR) .................. 10-2014-0067893

(51) Int. Cl.
*G06F 3/02*    (2006.01)
*B62D 1/04*    (2006.01)
(Continued)

(52) U.S. Cl.
CPC .............. *B62D 1/046* (2013.01); *B60K 35/00* (2013.01); *B60K 37/06* (2013.01); *B60Q 1/1484* (2013.01);
(Continued)

(58) Field of Classification Search
CPC .... B60K 2350/1016; B60K 2350/1024; B60K 2350/1036; B60K 2350/1068;
(Continued)

(56) References Cited

U.S. PATENT DOCUMENTS

| | | | |
|---|---|---|---|
| 8,768,286 B2 * | 7/2014 | Naboulsi | A61B 5/18 340/575 |
| 2007/0247420 A1 * | 10/2007 | Strohband | H01H 13/84 345/156 |

(Continued)

FOREIGN PATENT DOCUMENTS

| | | |
|---|---|---|
| DE | 10 2012 214017 | 6/2013 |
| JP | 2005-216110 | 8/2005 |

(Continued)

OTHER PUBLICATIONS

Extended European Search Report issued in European Application No. 15001667.3 dated Nov. 17, 2015, 11 pages.
(Continued)

*Primary Examiner* — Afroza Chowdhury
(74) *Attorney, Agent, or Firm* — Fish & Richardson P.C.

(57) ABSTRACT

An input system for a vehicle having a steering wheel includes an input unit with a plurality of buttons that are disposed in the steering wheel of the vehicle, and a processor configured to detect an event and to assign a function to at least one of the buttons that corresponds to the detected event. At least one of the plurality of buttons includes a display portion configured to display an image corresponding to the assigned function, and an operation portion disposed under the display portion, the operation portion including one or more protruding members that are activatable. The one or more protruding members are configured, based on the image displayed on the display portion being divided into a plurality of areas, to be activated so as to correspondingly constrain a movement of the display portion relative to the operation portion.

20 Claims, 33 Drawing Sheets

(51) Int. Cl.

| | |
|---|---|
| *B60K 35/00* | (2006.01) |
| *B60K 37/06* | (2006.01) |
| *G06F 3/01* | (2006.01) |
| *B60Q 1/14* | (2006.01) |
| B60Q 1/00 | (2006.01) |
| G05G 9/047 | (2006.01) |
| G06F 3/0338 | (2013.01) |
| G06F 3/041 | (2006.01) |
| H01H 25/04 | (2006.01) |
| H01H 9/06 | (2006.01) |

(52) U.S. Cl.
CPC ............ *G06F 3/016* (2013.01); *G06F 3/0219* (2013.01); *B60K 2350/1016* (2013.01); *B60K 2350/1024* (2013.01); *B60K 2350/1036* (2013.01); *B60K 2350/1068* (2013.01); *B60K 2350/1096* (2013.01); *B60K 2350/2004* (2013.01); *B60K 2350/928* (2013.01); *B60Q 1/0082* (2013.01); *G05G 9/047* (2013.01); *G06F 3/0338* (2013.01); *G06F 3/041* (2013.01); *H01H 25/041* (2013.01); *H01H 2009/066* (2013.01); *Y10T 74/20834* (2015.01)

(58) Field of Classification Search
CPC .... B60K 2350/1096; B60K 2350/2004; B60K 2350/928; B60K 35/00; B60K 37/06; B60Q 1/0082; B60Q 1/1484; B62D 1/046; G05G 9/047; G06F 3/016; G06F 3/0219; G06F 3/0338; G06F 3/041; H01H 2009/066; H01H 25/041
See application file for complete search history.

(56) References Cited

U.S. PATENT DOCUMENTS

| | | |
|---|---|---|
| 2009/0237364 A1 | 9/2009 | Bloomcamp et al. |
| 2009/0250267 A1* | 10/2009 | Heubel ................. G06F 3/041 178/18.03 |
| 2010/0039412 A1* | 2/2010 | Kim .................... G06F 3/04812 345/204 |
| 2012/0283894 A1* | 11/2012 | Naboulsi ................ A61B 5/18 701/1 |
| 2013/0161164 A1 | 6/2013 | Taka et al. |
| 2013/0213179 A1* | 8/2013 | Hatanaka ................ B62D 1/04 74/552 |

FOREIGN PATENT DOCUMENTS

| | | |
|---|---|---|
| KR | 10-2006-026157 A | 3/2006 |
| KR | 10-836225 B1 | 6/2008 |

OTHER PUBLICATIONS

Office Action dated Jun. 4, 2015 for corresponding Korean Patent Application No. 10-2014-0067893, 5 pages.

* cited by examiner

INPUT SYSTEM DISPOSED IN STEERING WHEEL AND VEHICLE INCLUDING THE SAME

CROSS-REFERENCE TO RELATED APPLICATION

This application claims the priority benefit of Korean Patent Application No. 10-2014-0067893, filed on Jun. 3, 2014, in the Korean Intellectual Property Office, the disclosure of which is incorporated herein by reference.

FIELD

The present disclosure relates to an input system disposed in a steering wheel and a vehicle including the same and, more particularly, to an input system disposed in a steering wheel to improve user convenience and a vehicle including the same.

BACKGROUND

A vehicle is a device that moves in a direction desired by a driver. A representative example of the vehicle is a car. The driver may change the moving direction of the vehicle by rotating a steering wheel.

Fixed mechanical buttons can be disposed in the steering wheel of the vehicle. In such a case, the buttons may be assigned with fixed functions.

SUMMARY

Accordingly, an object of the present disclosure is to provide an input device disposed in a steering wheel of a vehicle.

According to one aspect, an input system for a vehicle having a steering wheel includes an input unit having a plurality of buttons that are disposed in the steering wheel of the vehicle, and a processor configured to detect an event and to assign a function to at least one of the buttons that corresponds to the detected event. At least one of the plurality of buttons includes a display portion configured to display an image corresponding to the assigned function, and an operation portion disposed under the display portion. The operation portion includes one or more protruding members that are activatable. The one or more protruding members are configured, based on the image displayed on the display portion being divided into a plurality of areas, to be activated so as to correspondingly constrain a movement of the display portion relative to the operation portion.

Implementations according to this aspect may include one or more of the following features. For example, the operation portion may include a plurality of protruding members, the protruding members being bar-shaped and oriented in at least two directions, and at least one of the protruding members may be configured to protrude upward, based upon being activated, to correspondingly constrain the movement of the display portion relative to the operation portion. The display portion may be configured to pivot, based upon the protruding member being protruded, about a portion of the protruded protruding member. The operation portion may be configured to sense touch input of a user in areas other than the portions that include the one or more protruding members. The operation portion may further include an actuator that is configured to actuate the at least one of the protruding members to the protruded position.

Further according to this aspect, the input system may also include a display configured to display an image related to the function that is assigned to the button. When the image displayed on the display portion is divided into the plurality of areas and touch input of a user is made in one of the areas, the processor may control the display to highlight the area corresponding to the touch input. The processor may be configured, based on the image displayed on the display portion being divided into a plurality of areas, to correspondingly vary areas of the operation portion that can sense touch input of a user. The plurality of buttons may include a first button and a second button. The processor may be configured to control to be performed the display portion of the first button to display a menu button, the display portion of the first button to display images according to selection input of the menu button, the display to display a menu screen, a second button to display an image corresponding to a predetermined item of the menu screen if the up and down buttons displayed on the first button are operated, and an operation corresponding to an item selected via selection input of the second button. The plurality of buttons may include a first button that is configured to display a first four-direction button image in the display portion, and the processor may be configured to determine whether a finger of a user touches the first button, the display being configured to, based on the processor determining that the finger touched the first button, display an image corresponding to the first four-direction button. The plurality of buttons may include a second button that is configured to display a second four-direction button image in the display portion, and the processor may be configured to determine whether the finger of the user touches the second button, the display being configured to, based on the processor determining that the finger touched the second button, display an image corresponding to the second four-direction button.

Also according to this aspect, the input system may further include an interface configured to exchange data with a navigation device inside the vehicle, wherein the processor may be configured, based on a selective item being displayed on the navigation device, to receive information related to the selective item via the interface and to control at least one of the plurality of buttons to display an image for selecting the selective item. The operation portion may include a plurality of protruding members, the protruding members being bar-shaped, oriented in at least two directions, and configured to move downward based upon being pressed, and at least one of the protruding members may be configured to remain fixed in a protruded state, based upon being activated, to correspondingly constrain the movement of the display portion relative to the operation portion. The display portion may be configured to pivot, based upon the protruding member being in the protruded state, about a portion of the protruded protruding member.

According to another aspect, a vehicle includes wheels, a steering wheel configured to control a direction of the vehicle, and an input system for a vehicle having a steering wheel. The input system of the vehicle includes an input unit having a plurality of buttons that are disposed in the steering wheel of the vehicle, and a processor configured to detect an event and to assign a function to at least one of the buttons that corresponds to the detected event. At least one of the plurality of buttons includes a display portion configured to display an image corresponding to the function, and an operation portion disposed under the display portion, the operation portion including one or more protruding members that are activatable. The one or more protruding members may be configured, based on the image displayed on the display portion being divided into a plurality of areas, to be activated so as to correspondingly constrain a movement of the display portion relative to the operation portion.

Implementations according to this aspect may include one or more of the following features. For example, the operation portion may include a plurality of protruding members, the protruding members being bar-shaped and oriented in at least two directions, and at least one of the protruding members may be configured to protrude upward, based upon being activated, to correspondingly constrain the movement of the display portion relative to the operation portion. The vehicle may further include a display configured to display an image related to the function that is assigned to the button. The vehicle may further include an interface configured to exchange data with a navigation device inside the vehicle, wherein the processor may be configured, based on a selective item being displayed on the navigation device, to receive information related to the selective item via the interface and to control at least one of the plurality of buttons to display an image for selecting the selective item.

According to yet another aspect, a button includes a display portion configured to display an image corresponding to a function that is assigned to the button, and an operation portion disposed under the display portion, the operation portion including one or more protruding members that are activatable. The one or more protruding members are configured, based on the image displayed on the display portion being divided into a plurality of areas, to be activated so as to correspondingly constrain a movement of the display portion relative to the operation portion.

Implementations according to this aspect may include one or more of the following features. For example, the operation portion may include a plurality of protruding members, the protruding members being bar-shaped and oriented in at least two directions, wherein at least one of the protruding members are configured to protrude upward, based upon being activated, to correspondingly constrain the movement of the display portion relative to the operation portion, and the display portion may be configured to pivot, based upon the protruding member being protruded, about a portion of the protruded protruding member.

BRIEF DESCRIPTION OF THE DRAWINGS

The accompanying drawings, which are included to provide a further understanding of the application and are incorporated in and constitute a part of this application, illustrate implementation(s) of the application and together with the description serve to explain the principle of the application. In the drawings.

Like reference symbols in the various drawings indicate like elements.

DETAILED DESCRIPTION

Various implementations of the present disclosure will be described in detail with reference to the accompanying drawings.

Hereinafter, the terms "module" and "unit" used to signify components are used to promote the general understanding of disclosure and thus may not be referring to specific meanings or functions. Accordingly, the terms "module" and "unit" may be used interchangeably.

A vehicle described in the present specification may include a car, a motorcycle, and a bicycle, just to name a few. In the following descriptions, a car will be focused upon as a vehicle, but it will be understood that other types of vehicles may be used.

An input system disposed in a steering wheel of a vehicle, which is described in the present specification, may be called a dynamic human machine interface (HMI), the function of which may vary according to user manipulation, driving state of the vehicle, etc. A description is now given of an input system disposed in a steering wheel of a vehicle, according to an implementation of the present disclosure.

Figure 1:
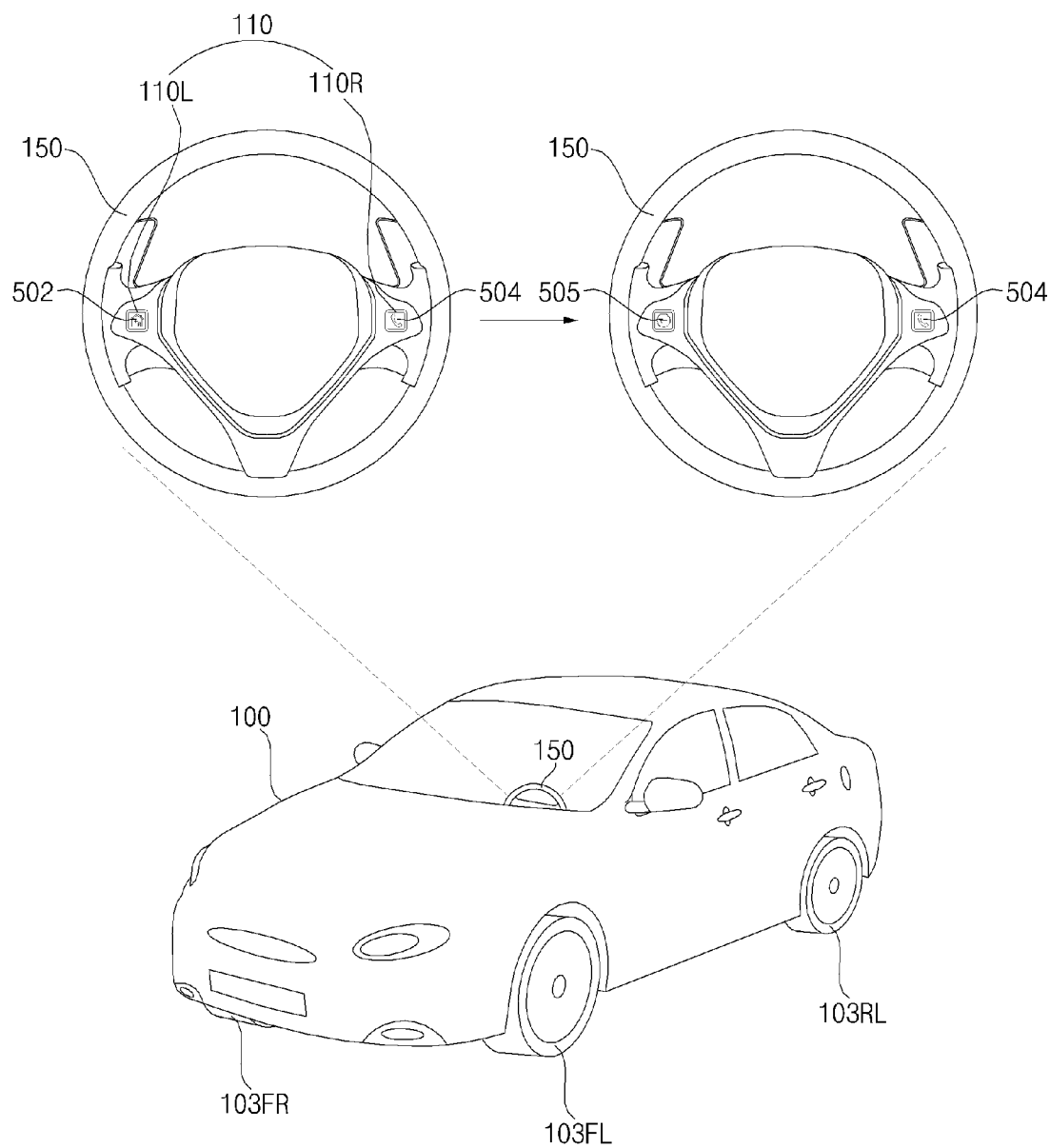
FIG. 1 is a schematic view illustrating an example vehicle and an example steering wheel inside the vehicle, according to an implementation of the present disclosure.
Figure 2:
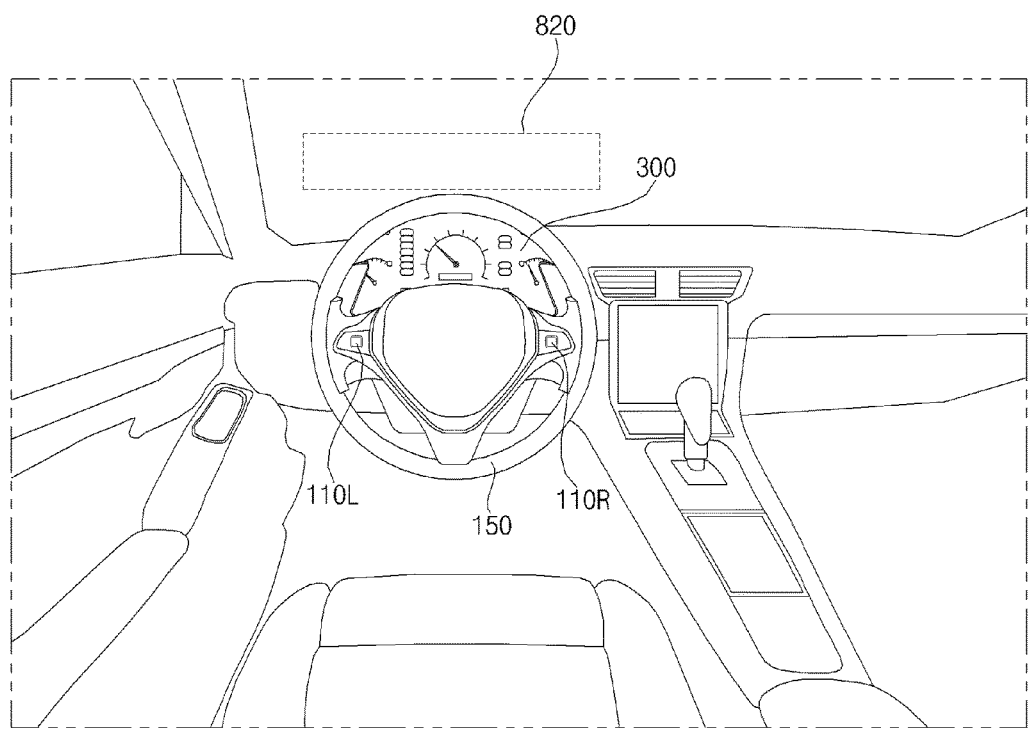
FIG. 2 is a schematic view illustrating the internal configuration of the vehicle of FIG. 1.

FIG. 1 illustrates a vehicle 100 and a steering wheel 150 inside the vehicle 100, according to an implementation of the present disclosure, and FIG. 2 illustrates the internal configuration of the vehicle 100.

Referring to FIGS. 1 and 2, the vehicle 100 may include wheels 103FR, 103FL, 103R (with wheel 103RR being hidden behind vehicle 100 in FIG. 1) that can rotate due to power supplied thereto, the steering wheel 150 for controlling the direction of the vehicle 100, and an input system disposed in the steering wheel 150 and having a variable function for at least one of a plurality of buttons.

In some cases, the vehicle 100 may have an engine for supplying power based on fossil fuel and an electric motor for supplying power using a direct current (DC) power source such as solar cells or a battery, etc. Further, the vehicle 100 may have a transmission for converting the power supplied from the engine into a torque, a brake for stopping the vehicle 100, and other features for propelling and stopping the vehicle 100. The vehicle 100 may include a conventional vehicle having a combustion engine, a hybrid vehicle having a combustion engine and an electric motor, and an electric vehicle having an electric motor.

In relation to an implementation of the present disclosure, the input system may be disposed in the steering wheel 150 and the function of at least one of a plurality of buttons may be changed. In some cases, the entire input system may be disposed in the steering wheel 150. Alternatively, some portions of the input system may be disposed in the steering wheel 150 while other portions of the input system may be disposed elsewhere in the vehicle 100.

FIG. 1 shows a first button 110L and a second button 110R that are respectively disposed at left and right sides of the steering wheel 150. The first and second buttons 110L and 110R may respectively display images 502 and 504 indicating functions thereof.

At least one of the first and second buttons 110L and 110R may not only receive input based on user manipulation but also display an image related to a function thereof.

The first and second buttons 110L and 110R may form an input unit 110. The input unit 110 enables input and output and thus may also be called an input/output unit.

When a user presses the first button 110L of the input unit 110 while driving the vehicle 100, the function of the first button 110L may change from a first function (e.g., menu button function) to a second function (e.g., up/down button function). Then, an image corresponding to the changed function may be displayed on the first button 110L.

As such, the user may easily access a desired function using at least one of the first and second buttons 110L and 110R and execute various functions while still holding the steering wheel 150 of the vehicle 100 and driving the vehicle 100.

In other words, unlike fixed buttons disposed in a steering wheel of a vehicle, the functions of buttons are dynamically changed and thus user convenience may be improved.

Since the user can find and execute various functions based on motions of a finger, e.g., a thumb, while the user is still driving the vehicle 100, looking ahead, and holding the steering wheel 150 of the vehicle 100, driving safety may be improved.

The functions of the first and second buttons 110L and 110R may be assigned variably based on an event. For example, when a call is received by a mobile device of the user while driving the vehicle 100, a received call signal may be input to the input system, and a call-related function may be assigned to and a related image displayed on the first button 110L.

As another example, when the first button 110L is operated based on user input, an up/down button function may be assigned to and an up/down button image displayed on the first button 110L to enable selection of a menu item.

FIG. 2 illustrates the internal configuration of the vehicle 100 and shows an instrument cluster 300 and an output area 820 in addition to the first and second buttons 110L and 110R disposed in the steering wheel 150. Here, the output area 820 shows an example of a display and may output an image related to the input unit 110. The output area 820 is an area for displaying an image projected from a projector display and may correspond to a certain area of the windshield of the vehicle 100. In some cases, the output area 820 may be a display area formed by a head up display (HUD).

At least one of the first and second buttons 110L and 110R of the input unit 110 according to an implementation of the present disclosure may include a display portion 310 for displaying an image corresponding to a function. An operation portion 320 may be disposed under the display portion 310. When the image displayed on the display portion 310 is divided into a plurality of areas, the operation portion 320 may be activatable such that differentiation of at least one of the plurality of areas, as further described below.

Specifically, the operation portion 320 may include one or more protruding members. In some cases, the protruding members may be in the shape of bars. Theses protruding members, such as bars, may protrude to correspond to at least one of the plurality of areas if the image displayed on the display portion 310 is divided into such areas, thereby allowing the user to feel which areas are pressable. In some cases, the operation portion 320 may include a plurality of bars oriented in at least two different directions.

Figure 3A:
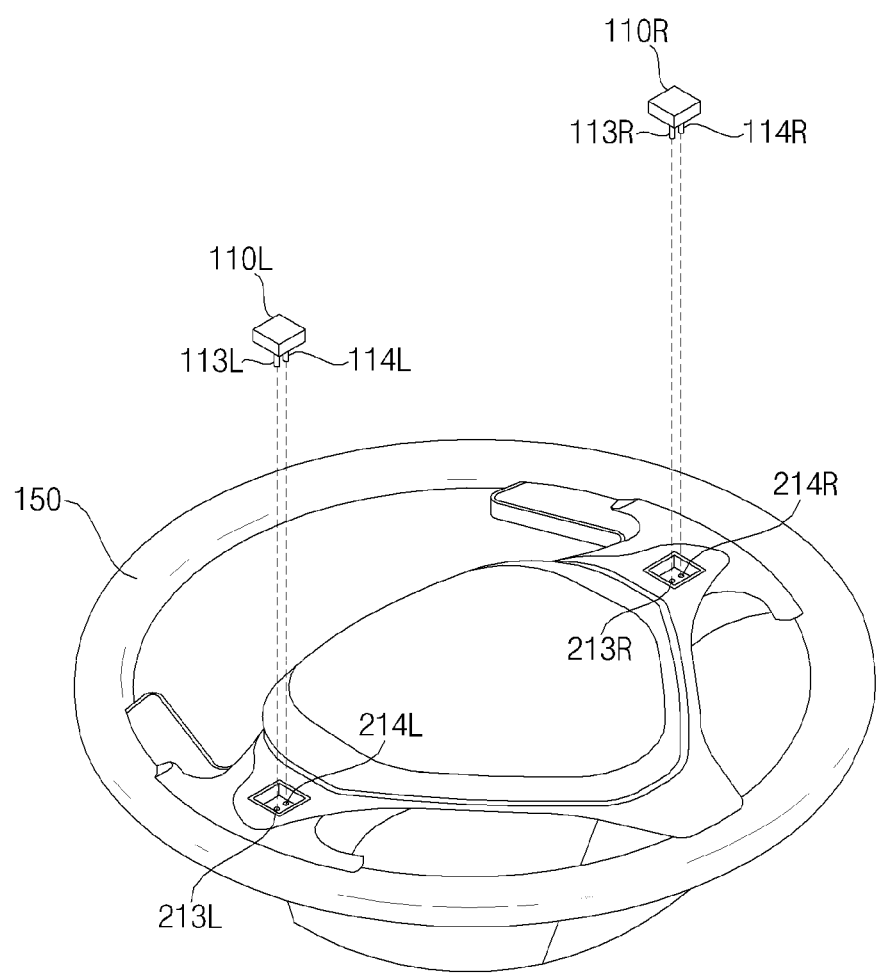
FIG. 3A is a perspective view illustrating a coupling of the steering wheel of FIG. 1 and an input unit.

Referring to FIG. 3A, the first and second buttons 110L and 110R of the input unit 110 may be respectively disposed, for example, in recesses formed in the steering wheel 150 of the vehicle 100.

The first and second buttons 110L and 110R are illustrated as hexahedrons having rectangular cross sections in FIG. 3A, but may also have other shapes, for example cylinders having circular cross sections.

The first and second buttons 110L and 110R may respectively include connection terminals 113L and 114L and connection terminals 113R and 114R thereunder so as to be disposed in the steering wheel 150.

The steering wheel 150 may include coupling recesses 213L and 214L for the connection terminals 113L and 114L corresponding to the first button 110L, and coupling recesses 213R and 214R for the connection terminals 113R and 114R corresponding to the second button 110R.

The connection terminals 113L and 114L corresponding to the first button 110L may respectively correspond to a power supply terminal for receiving power supplied from a battery disposed inside the vehicle 100, and a terminal for exchanging data with an electronic device inside the vehicle 100, e.g., an audio video navigation (AVN) device.

Further, the connection terminals 113R and 114R corresponding to the second button 110R may respectively correspond to a power supply terminal for receiving power supplied from a battery disposed inside the vehicle 100, and a terminal for exchanging data with an electronic device inside the vehicle 100, e.g., an AVN device.

Figure 3B:
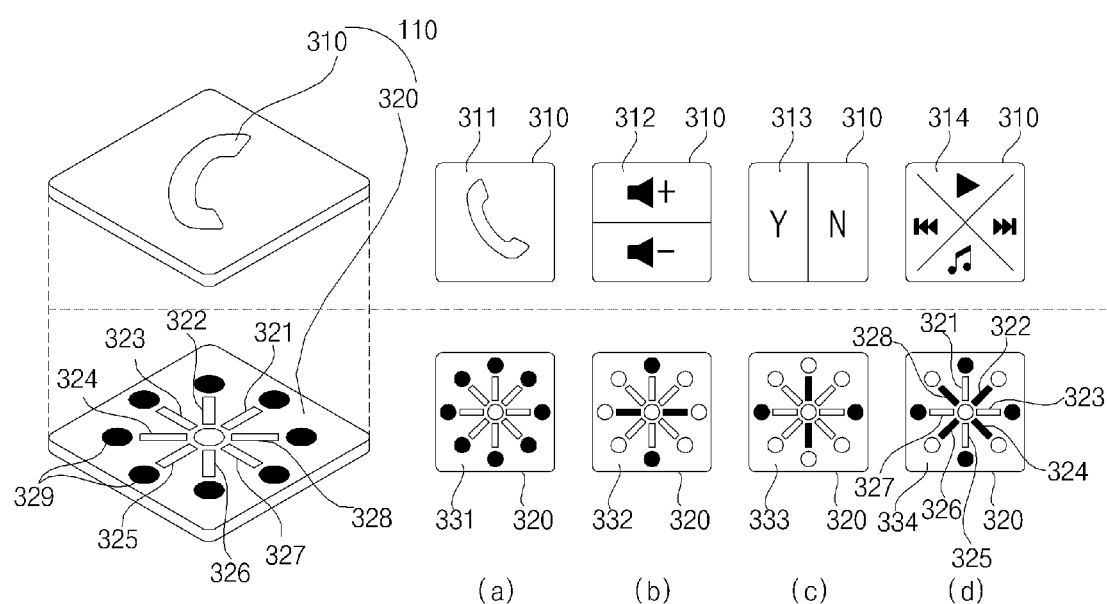
FIG. 3B is a schematic view illustrating an exemplary configuration of the input unit of FIG. 1.

FIG. 3B is illustrates an exemplary configuration of the input unit 110 of FIG. 1.

Referring to FIG. 3B, the input unit 110, e.g., a button, may include the display portion 310 and the operation portion 320 disposed under the display portion 310.

The display portion 310 may display an image of the function assigned to the button. The display portion 310 may be implemented as a liquid crystal display (LCD), an organic light-emitting diode (OLED), or the like.

In some cases, the display portion 310 may be configured to sense touch input. In this case, the display portion 310 may include a touchscreen.

The touchscreen may sense touch of, for example, a finger of the user using various schemes, e.g., capacitive and resistive schemes, and display an image corresponding to a touch operation or an assigned function.

If the display portion 310 is configured to sense touch input, tapping input, dragging input, and flicking input, among others, may be performed by the user on the display portion 310.

The operation portion 320 is disposed under the display portion 310 and, if the image displayed on the display portion 310 is divided into a plurality of areas, can be correspondingly operated to differentiate at least one of the plurality of areas.

To this end, the operation portion 320 may include one or more bars that protrude to help guide the movement of the display portion 310 upon manipulation by the user. For example, some of the bars may be operated to protrude from the surface of the operation portion 320 toward the display portion 310 to correspond to a division of the image displayed on the display portion 310. By constraining a downward movement of a portion of the display portion 310 that corresponds to the protruding bar, the display portion 310 may be caused to pivot with respect to the protruding bar or bars upon manipulation by the user. This way, the input unit 110 may be operated like a rocker-type button that can, for example, be pressed into one of several positions.

FIG. 3B illustrates an implementation of the operation portion 320 in which a plurality of protruding members in the form of bars 321-328 are arranged in eight different directions, respectively, across the surface of the operation portion 320. As further described below, the bars 321-328 can be selectively operated to correspond to the image displayed on the display portion 310.

The operation portion 320 may be configured to sense contact with the display portion 310. For example, the operation portion can include multiple input areas 329 that can sense contact with and/or pressure coming from the display portion 310 as a consequence of the user's manipulation. The input areas 329 may protrude from the surface of the operation portion 320 or may be flush. The input areas 329 may be in the form of buttons, touch sensors, pressure sensors, or the like.

As illustrated in bar configuration 331 of FIG. 3B(a), when a single image, such as a phone image 311, is displayed on the display portion 310, none of the bars 321-328 may protrude from the surface of the operation portion 320. This way, touch input may be possible throughout the entire area of the operation portion 320. For example, the blackened circles illustrate which of the input areas 329 are available to sense touch input. Here, because the downward movement of the display portion 310 is not constrained by the bars, all of the input areas 329 can receive input.

As illustrated in bar configuration 332 of FIG. 3B(b), when an up/down divided image, such as media volume +/− image 312, is displayed on the display portion 310, the bars 323 and 327 (blackened for clarity) disposed in a left-right direction may protrude from the surface of the operation portion 320 while the other bars 321, 322, 324-326, and 328 remain in a non-protruding state. This way, touch input may be possible only in areas of the operation portion 320 that correspond to the up/down movement of the input unit 110. For example, the blackened circles illustrate which of the input areas 329 may be available to sense touch input. As described above, the protrusion of bars 323 and 327 causes the display portion 310 to pivot with respect to the bars 323 and 327, thereby limiting the areas of the operation portion 320 that can sense input based on contact with the display portion 310. Accordingly, due to the protrusions, the user may be able to tactilely feel the divided areas when the input unit 110 is touched.

Here, since a part of the input unit 110 is operated like a seesaw due to the operation of the operation portion 320, the button of the input unit 110 may be also called a seesaw button.

As illustrated in bar configuration 333 of FIG. 3B(c), when a left/right divided image, such as yes/no (Y/N) image 313, is displayed on the display portion 310, the bars 321 and 325 (blackened for clarity) disposed in an up-down direction may protrude from the surface of the operation portion 320 while the other bars 322-324 and 326-328 remain in a non-protruding state. This way, touch input may be possible only in areas of the operation portion 320 that correspond to the left/right movement of the input unit 110. For example, the blackened circles illustrate which of the input areas 329 may be available to sense touch input. As described above, the protrusion of bars 321 and 325 causes the display portion 310 to pivot with respect to the bars 321 and 325, thereby limiting the areas of the operation portion 320 that can sense input based on contact with the display portion 310. Accordingly, due to the protrusions, the user may be able to tactilely feel the divided areas when the input unit 110 is touched.

As illustrated in bar configuration 334 of FIG. 3B(d), when a up/down/left/right divided image, such as a four-direction image 314 related to media play, is displayed on the display portion 310, the bars 322, 324, 326, and 328 (blackened for clarity) disposed in diagonal directions may protrude from the surface of the operation portion 320 while the other bars 321, 323, 325, and 327 remain in non-protruding state. This way, touch input may be possible only in areas of the operation portion 320 that correspond to the up/down/left/right movement of the input unit 110. For example, the blackened circles illustrate which of the input areas 329 may be available to sense touch input. As described above, the protrusion of bars 322, 324, 326, and 328 causes the display portion 310 to pivot with respect to these bars, thereby limiting the areas of the operation portion 320 that can sense input based on contact with the display portion 310. For example, bars 322 and 328 can cause pivoting in an upward direction, bars 324 and 326 can cause pivoting in a downward direction, bars 322 and 325 can cause pivoting in a rightward direction, and bars 326 and 328 can cause pivoting in a leftward direction. Accordingly, due to the protrusions, the user may be able to tactilely feel the divided areas when the input unit 110 is touched.

The operation portion 320 may sense touch input of the user at any area, for example in the input areas 329. Alternatively, or additionally, each of the bars 321 to 328 may include a touch sensor. For example, when some of the bars 321 to 328 protrude while the others do not protrude, the non-protruding bars may be activated to act as touch sensors that can sense touch input. The protruding bars, on the other hand, may be inactivated so as to not operate as touch sensors.

To allow each of the bars 321 to 328 to selectively protrude upward, the operation portion 320 may further include an actuator disposed under the bars 321 to 328 that cause the bars to protrude upward.

In some cases, instead of having protruding members, such as the bars 321-328 described above, that upon being activated to protrude upward from a non-protruding resting state to constrain movement of the input unit 110, the protruding members may initially be at a protruded resting state. In this case, the members, upon activation, may become fixed in the protruded state while non-activated members may be movable downward with little to no resistance. As such, the movement constraint of the input unit 110 as described above using bars 321-328 may be similarly achieved by activating certain bars to remain protruded (i.e. instead of activating certain bars to become protruded).

Figure 4:
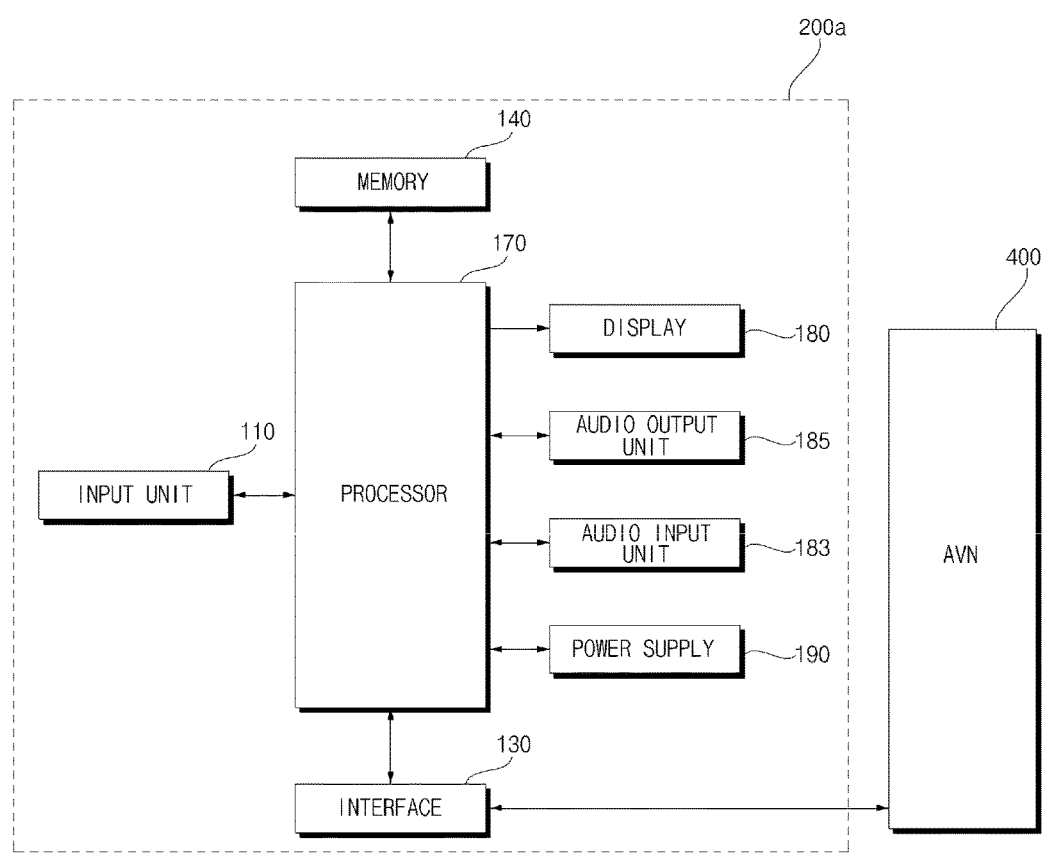
FIG. 4 is a block diagram of an example input system disposed in a steering wheel, according to an implementation of the present disclosure.

Referring also to FIG. 4, when the image displayed on the display portion 310 is divided into a plurality of areas and touch input of the user is made in one of the areas, a processor 170 may control a display 180 to highlight the area corresponding to the touch input.

When the image displayed on the display portion 310 is divided into a plurality of areas, the processor 170 may control touchable areas of the input unit 110 to be changed.

The processor 170 may control the display portion 310 of the first button 110L to display a menu button, control the display portion 310 of the first button 110L to display up and down button images according to selection input of the menu button, control the display 180 to display a menu screen, control the second button 110R to display an image corresponding to a predetermined item of the menu screen if the up and down buttons displayed on the first button 110L are operated, and control an operation corresponding to an item selected via selection input of the second button 110R, to be performed.

The processor 170 may control the display portion 310 of the first button 110L to display a first four-direction button image, and control the display 180 to display an image corresponding to the first four-direction button image if a finger of the user touches the first button 110L.

In addition, the processor 170 may control the display portion 310 of the second button 110R to display a second four-direction button image, and control the display 180 to display an image corresponding to the second four-direction button image if a finger of the user touches the second button 110R.

When a selective item is displayed on a navigation device, the processor 170 may receive information related to the selective item via an interface 130 and control buttons for making a selection on the selective item to be displayed on at least one of a plurality of buttons.

A detailed description of various sample operations of the processor 170 and the input unit 110 will be given below with reference to FIGS. 5A to 12B.

FIG. 4 shows a block diagram of an input system 200a disposed in the steering wheel 150, according to an implementation of the present disclosure.

Referring to FIG. 4, the input system 200a may include the input unit 110, the interface 130, a memory 140, the processor 170, the display 180, an audio input unit 183, an audio output unit 185 and a power supply 190.

The input unit 110 includes a plurality of buttons disposed in the steering wheel 150 of the vehicle 100. As described above in relation to FIGS. 1 to 3, the input unit 110 may include the first and second buttons 110L and 110R.

The functions of the first and second buttons 110L and 110R may be assigned variably based on an event.

For example, when a call is received by a mobile device of the user while driving the vehicle 100, a received call signal may be input to the input system 200a, and a call-related function may be assigned to and a related image may be displayed on the first button 110L.

As another example, when the first button 110L is operated based on user input, an up/down button function may be assigned to and an up/down button image correspondingly displayed on the first button 110L to enable selection of a menu item.

At least one of the first and second buttons 110L and 110R may include the display portion 310 for displaying an image corresponding to a function, and the operation portion 320 may be disposed under the display portion 310. If the image displayed on the display portion 310 becomes divided into a plurality of areas, the operation portion 320 may be activatable as described above so as to enable tactile differentiation between the plurality of areas.

More specifically, the operation portion 320 may include a plurality of bars, where some of the bars may protrude to correspond to at least one of the plurality of areas if the image displayed on the display portion 310 is divided into the areas, thereby allowing the user tactilely feel the touchable areas.

In some cases, the display portion 310 may be configured to sense touch input. In this case, the display portion 310 may include a touchscreen. Moreover, the display portion 310 may be configured to sense at least one of tapping input, dragging input, and flicking input on the touchscreen, and the image displayed thereon may be changed based on user input.

The interface 130 may receive data related to the vehicle 100 and/or transmit an input signal received via the input unit 110 to an external device. In some cases, the interface 130 may perform data communication with an electronic control unit (ECU), AVN, etc. inside the vehicle 100 using a wired communication scheme.

For data communication using a wired communication scheme, the interface 130 may include the connection terminal 114L of the first button 110L and the connection terminal 114R of the second button 110R as illustrated in FIG. 3A.

In some cases, the interface 130 may receive global positioning system (GPS) information through data communication with the AVN and receive vehicle state information through data communication with the ECU. The vehicle state information may include at least one of battery information, fuel information, speed information, tire information, steering information based on steering wheel rotation, lamp information, internal temperature information, external temperature information, and internal humidity information of the vehicle 100, among others.

The memory 140 may store various types of data for overall operation of the input system 200a, e.g., programs for processing or control of the processor 170. For example, the memory 140 may store various functions implemented by the input unit 110 and images thereof. Alternatively, or additionally, the memory 140 may store functions of the input unit 110, which are assigned differently per user, and images thereof.

The audio output unit 185 may convert an electrical signal from the processor 170 into an audio signal and output the audio signal. For example, the audio output unit 185 may include a speaker or the like. The audio output unit 185 may output sound corresponding to operation of the input unit 110, e.g., a button.

The audio input unit 183 may receive voice of the user. For example, the audio input unit 183 may include a microphone. The received voice may be converted into an electrical signal and then transmitted to the processor 170.

The processor 170 may control operation of each component of the input system 200a.

For example, the processor 170 may change the function of at least one of a plurality of buttons based on a manipulation signal of the user on the input unit 110.

Specifically, when at least one of the buttons includes a touchscreen, the processor 170 may change the function of the button based on at least one of tapping input, dragging input, and flicking input on the touchscreen. In this case, the processor 170 may control the touchscreen to display an image corresponding to the function assigned to the button.

When the image displayed on the display portion 310 is divided into a plurality of areas, the processor 170 may control touchable areas of the input unit 110 to be changed.

The processor 170 may control the display portion 310 of the first button 110L to display a menu button, control the display portion 310 of the first button 110L to display up and down button images according to selection input of the menu button, control the display 180 to display a menu screen, control the second button 110R to display an image corresponding to a predetermined item of the menu screen if the up and down buttons displayed on the first button 110L are operated, and control an operation corresponding to an item selected via selection input of the second button 110R, to be performed.

In some cases, the processor 170 may control the display portion 310 of the first button 110L to display a first four-direction button image, and control the display 180 to display an image corresponding to the first four-direction button image if a finger of the user touches the first button 110L.

In addition, the processor 170 may control the display portion 310 of the second button 110R to display a second four-direction button image, and control the display 180 to display an image corresponding to the second four-direction button image if a finger of the user touches the second button 110R.

When a selective item is displayed on a navigation device, the processor 170 may receive information related to the selective item via the interface 130 and control buttons for making a selection on the selective item to be displayed on at least one of a plurality of buttons.

The processor 170 may assign a function to at least one of a plurality of buttons differently per user.

The display 180 may separately display an image corresponding to the function assigned to the button. To display the image, the display 180 may include the instrument cluster 300 illustrated in FIG. 2 or a head up display (HUD) at a front part inside the vehicle 100.

When the display 180 is a HUD, the display 180 may include a projection module for projecting an image onto the windshield of the vehicle 100.

The power supply 190 may supply power required for operation of each component, and may be under the control of the processor 170.

Specifically, the power supply 190 may include the connection terminal 113L of the first button 110L and the connection terminal 113R of the second button 110R to receive power supplied from a battery, etc. inside the vehicle 100 as described above in relation to FIG. 3A.

FIGS. 5A to 12B are reference views for describing sample operations of the input system 200a according to the implementation of FIG. 4.

Figure 5A:
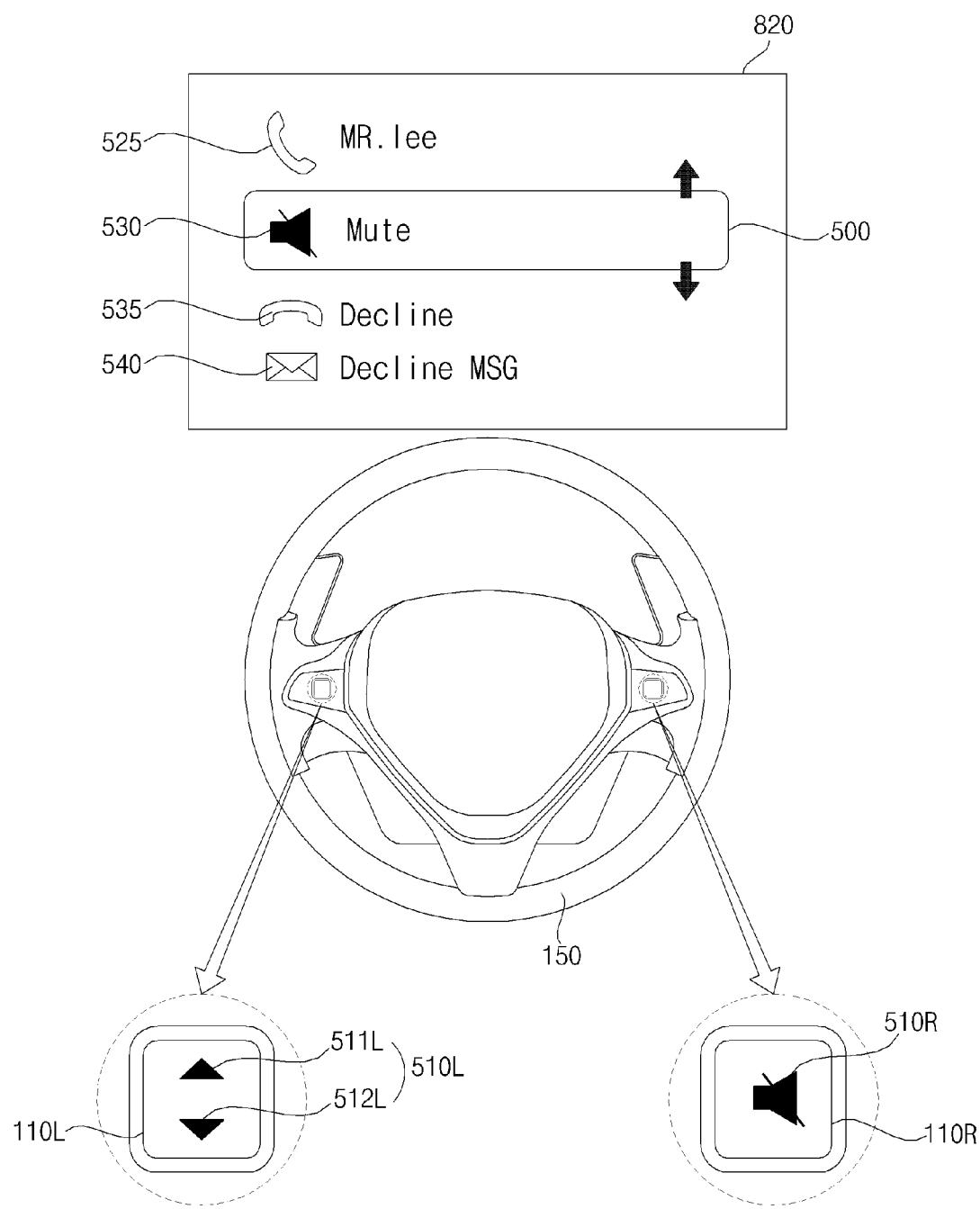
FIGS. 5A to 12B are reference views illustrating example operations of the input system according to the implementation of FIG. 4.

FIG. 5A illustrates an example of the first button 110L among a plurality of buttons (e.g., 110L and 110R) disposed in the steering wheel 150 of the vehicle 100. Specifically, FIG. 5A illustrates that an up/down button may be assigned to the first button 110L.

FIG. 5A further illustrates operation states of the first and second buttons 110L and 110R and the display area 820 when a call is received by a mobile device of the user while driving the vehicle 100.

The processor 170 may exchange data with the mobile device of the user via a communication unit or the interface 130 and, specifically, receive call reception information when a call is received. The processor 170 may control the display 180 to display a call-related menu in relation to the received call.

FIG. 5A shows an example scenario in which an answer call item 525, a mute item 530, a decline call item 535, and a decline message item 540 are displayed in the display area 820.

To select one of the items displayed in the display area 820, the processor 170 may control the first button 110L to display an image 510L including up and down buttons 511L and 511R, and control the second button 110R to display an image related to a corresponding item as the up and down buttons 511L and 511R of the first button 110L are operated.

FIG. 5A shows an example scenario in which a mute image 510R is displayed on the second button 511R as the up and down buttons 511L and 511R of the first button 110L are operated. In this case, if the user presses the second button 511R, the mute item 530 is selected and thus a mute function is executed.

A highlight bar 500 may be located over the mute item 530 among a plurality of items displayed in the output area 820, as the up and down buttons 511L and 511R of the first button 110L are operated.

As such, a driver may allow one of the items displayed in the output area 820 to be highlighted by operating the up and down buttons 511L and 511R of the first button 110L while driving, and easily select the highlighted item (e.g., 530) using the second button 110R.

Since the first button 110L is an up/down button, as illustrated in FIG. 3B(b), the bars 323 and 327 disposed in a left-right direction may protrude, without the other bars 321, 322, 324 to 326, and 328 not protruding, to indicate to the user that touch input is possible in up and down areas. As described above, since just some of the bars protrude, the user may tactilely feel the divided areas when operating the input unit 110.

A detailed description of operations of the first and second buttons 110L and 110R illustrated in FIG. 5A will be given below with reference to FIGS. 6A to 8c.

Figure 5B:
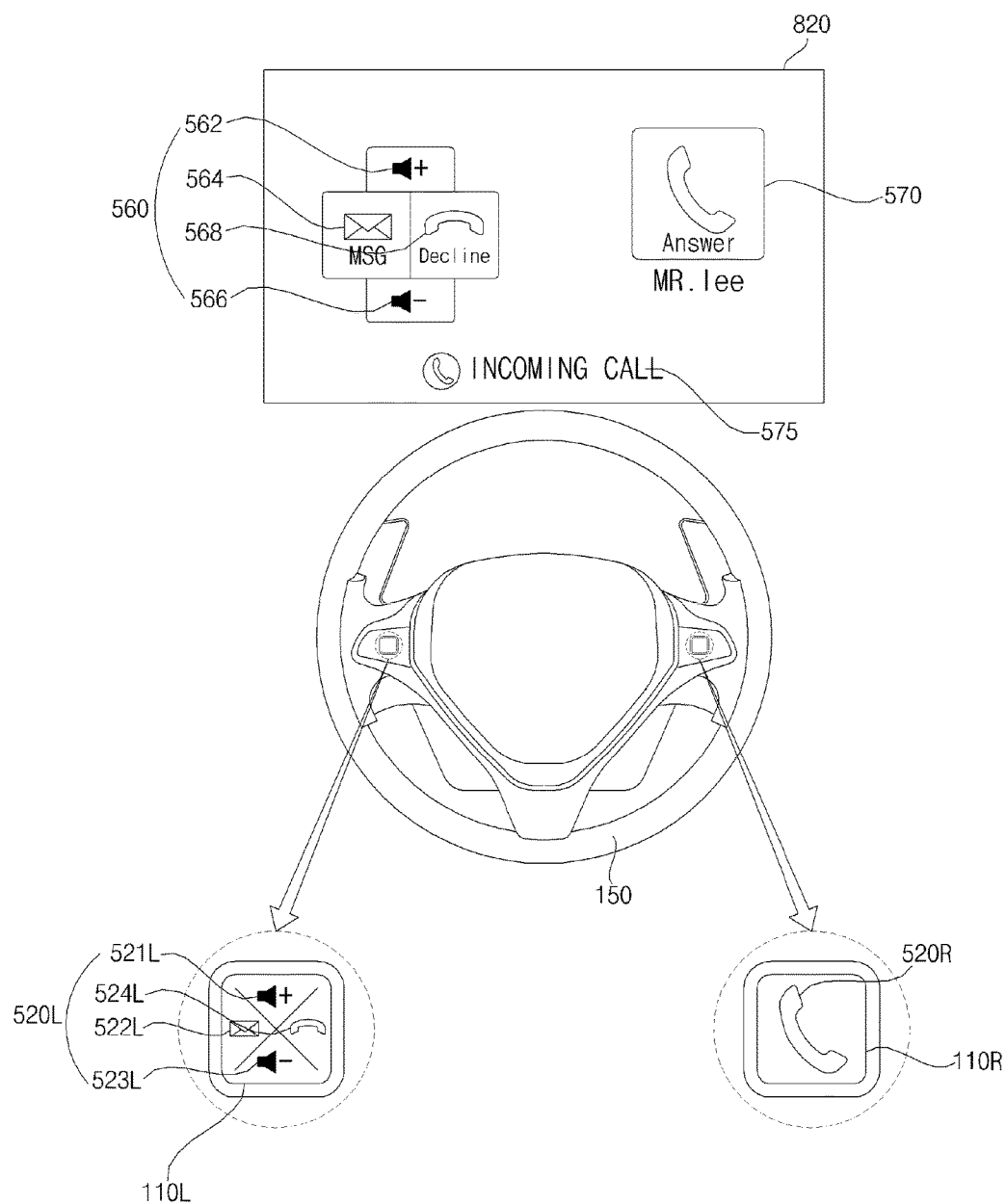

FIG. 5B illustrates another example of the first button 110L among a plurality of buttons (e.g., 110L and 110R) disposed in the steering wheel 150 of the vehicle 100. Specifically, FIG. 5B illustrates that a four-direction button may be assigned to the first button 110L.

FIG. 5B further illustrates operation states of the first and second buttons 110L and 110R and the display area 820 when a call is received by a mobile device of the user while driving the vehicle 100.

FIG. 5B shows an example scenario in which a volume up item 562, a message item 564, a decline call item 566, and a volume down item 568 are displayed in a left part of the display area 820 corresponding to the first button 110L. Further, FIG. 5B shows an example in which an answer call item 570 is displayed in a right part of the display area 820 corresponding to the second button 110R.

To enable selection of one of the items displayed in the display area 820, the processor 170 may control the first button 110L to display an image 520L including up, down, left and right buttons 521L, 522L, 523L and 524L, and control the second button 110R to display an image 520R corresponding to the answer call item 570.

As such, without a separate highlighting operation, the user may directly select a desired item by selecting the up, down, left and right buttons 521L, 522L, 523L, and 524L of the first button 110L or the second button 110R.

Since the first button 110L is a four-direction button, as illustrated in FIG. 3B(d), the bars 322, 324, 326, and 328 disposed in diagonal directions may protrude, without the other bars 321, 323, 325 and 327 protruding, to indicate that touch input is possible in up, down, left and right areas. As described above, since diagonal-direction bars protrude, the user may tactilely feel the up, down, left and right areas when operating the input unit 110.

A detailed description of operations of the first and second buttons 110L and 110R illustrated in FIG. 5B will be given below with reference to FIGS. 9A to 11B.

Figure 6A:
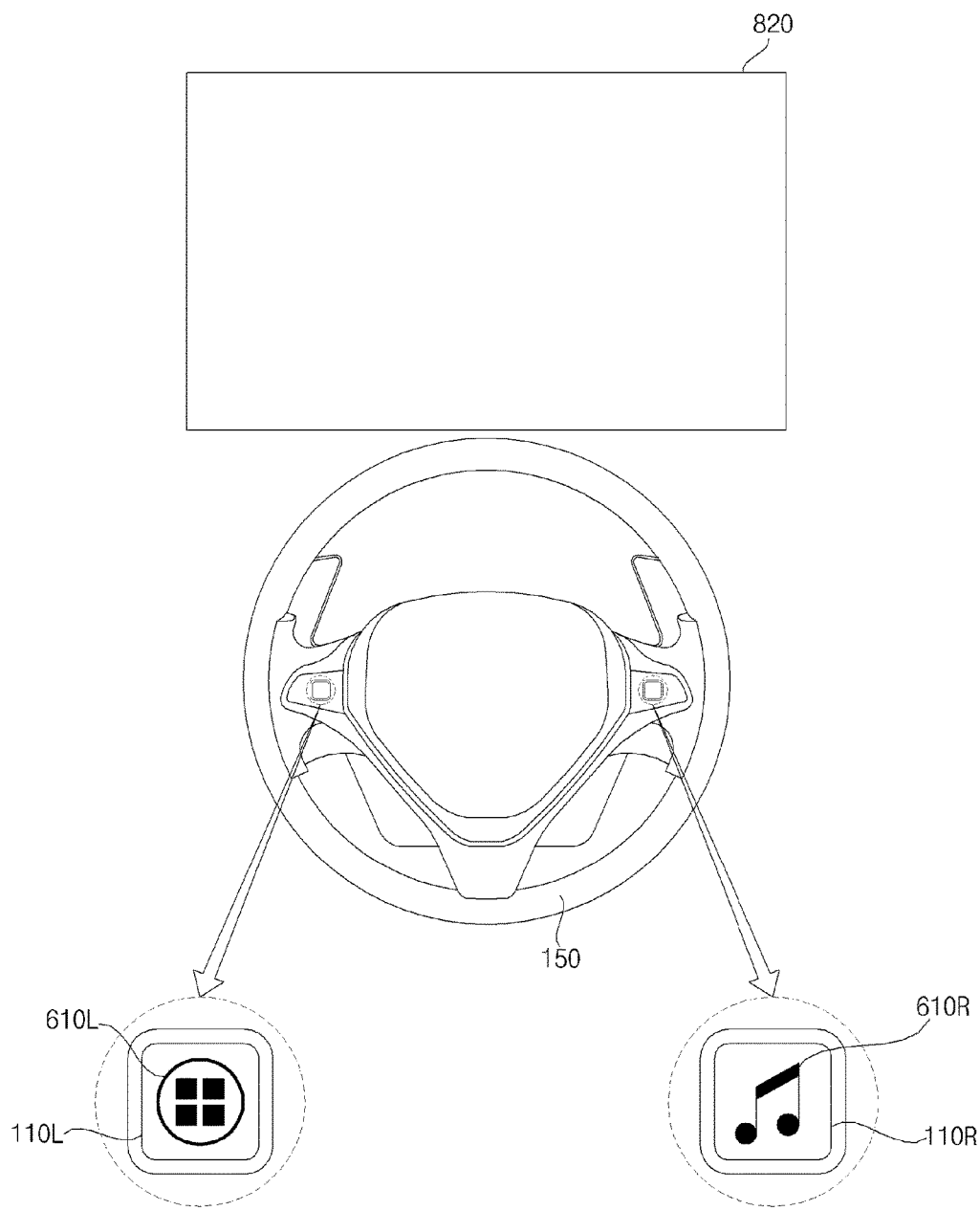

FIG. 6A shows an example scenario in which a menu button 610L is assigned to the first button 110L and a media button 610R is assigned to the second button 110R by default if no event occurs while driving the vehicle 100.

As illustrated, because no event has occurred, nothing is displayed in the output area 820.

Figure 6B:
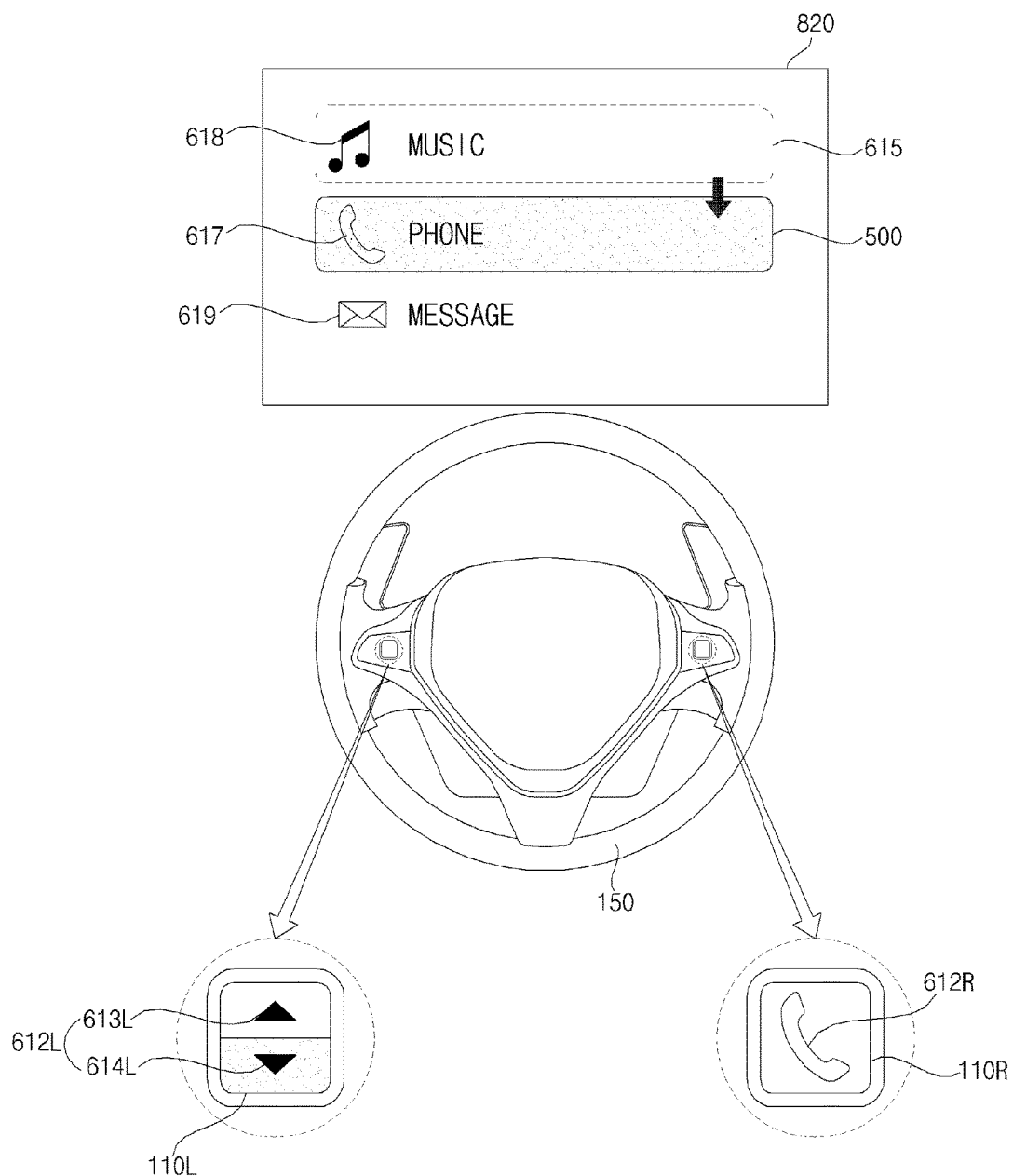

If the user presses the menu button 610L, menu items may be displayed in the output area 820 as illustrated in FIG. 6B. If the user presses the media button 610R, various items for media selection may be displayed in the output area 820.

FIG. 6B illustrates that, as the menu button 610L of FIG. 6A is pressed, corresponding menu items may be displayed in the output area 820. In FIG. 6B, an up/down button is assigned to the first button 110L as an example.

FIG. 6B shows an example in which a music item 618, a phone item 617, and a message item 619 are displayed in the output area 820.

If the user selects a down button 614L on an up/down button 612L formed on the first button 110L, the highlight bar 500 within the output area 820 may move from the music item 618 to the phone item 617 as illustrated in FIG. 6B.

An image corresponding to an item may be displayed on the second button 110R as the user moves to the item using the first button 110L. FIG. 6B shows an example in which an image 612R corresponding to the phone item 617 is displayed.

If the user does not manipulate the first and second buttons 110L and 110R for a predetermined time, the menu button 610L and the media button 610R may be respectively assigned to and displayed on the first and second buttons 110L and 110R as illustrated in FIG. 6A.

Figure 6C:
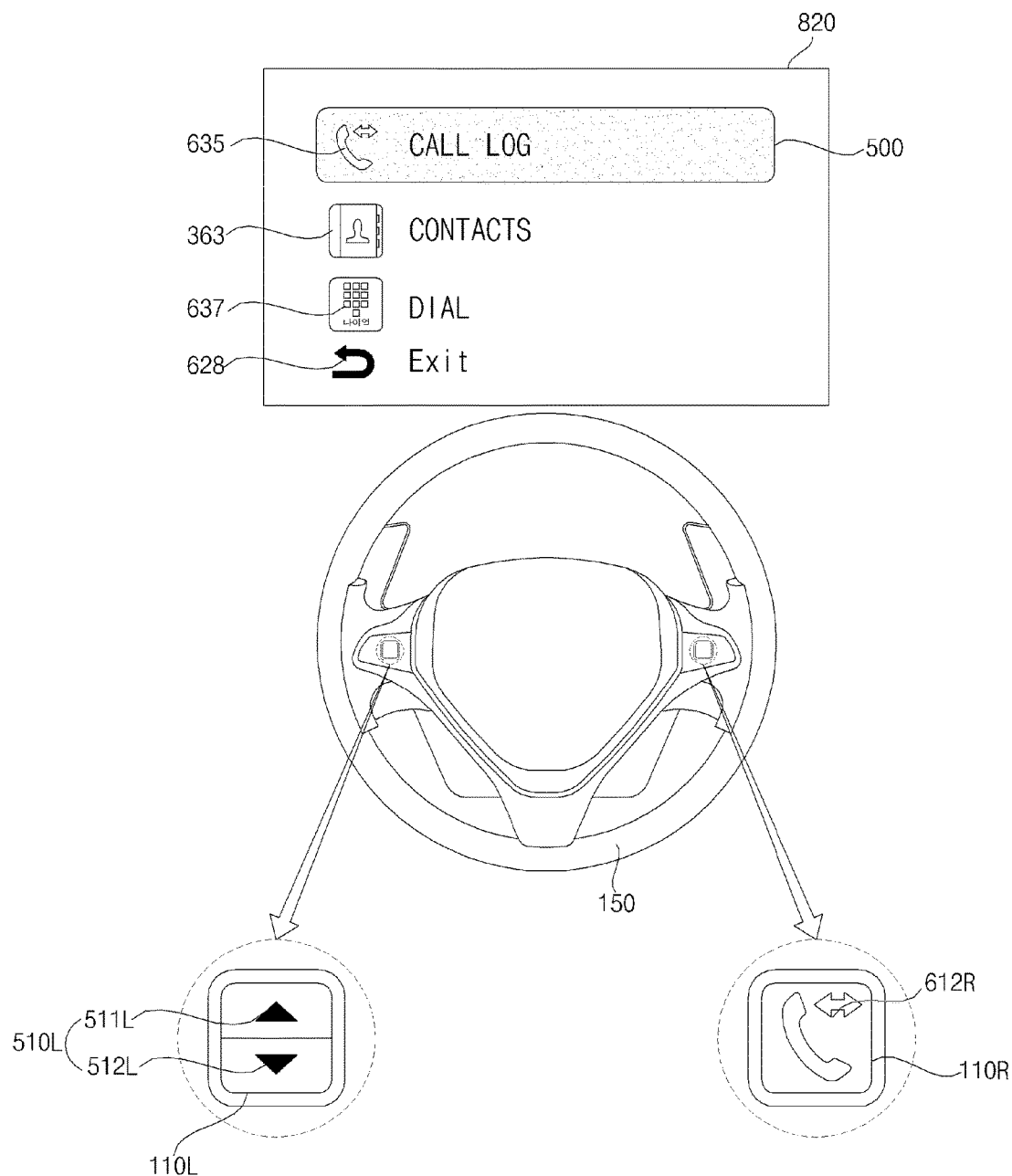

If the user presses the second button 110R on which the image 612R corresponding to the phone item 617 is displayed, the phone item 617 is selected and items related to phone calling may be displayed in the output area 820 as illustrated in FIG. 6C.

FIG. 6C illustrates that corresponding menu items may be displayed in the output area 820 as the second button 110R of FIG. 6B is pressed.

FIG. 6C shows an example scenario in which a call log item 635, a contacts item 363, a dial item 637, and an exit item 628 are displayed in the output area 820.

The user may select the up button 511L or the down button 512L of the up/down button 510L formed on the first button 110L and thus move to a desired item.

FIG. 6C shows an example in which the highlight bar 500 is located on the call log item 635 to highlight the call log item 635 and thus an image 612R corresponding to the call log item 635 is displayed on the second button 110R.

Figure 6D:
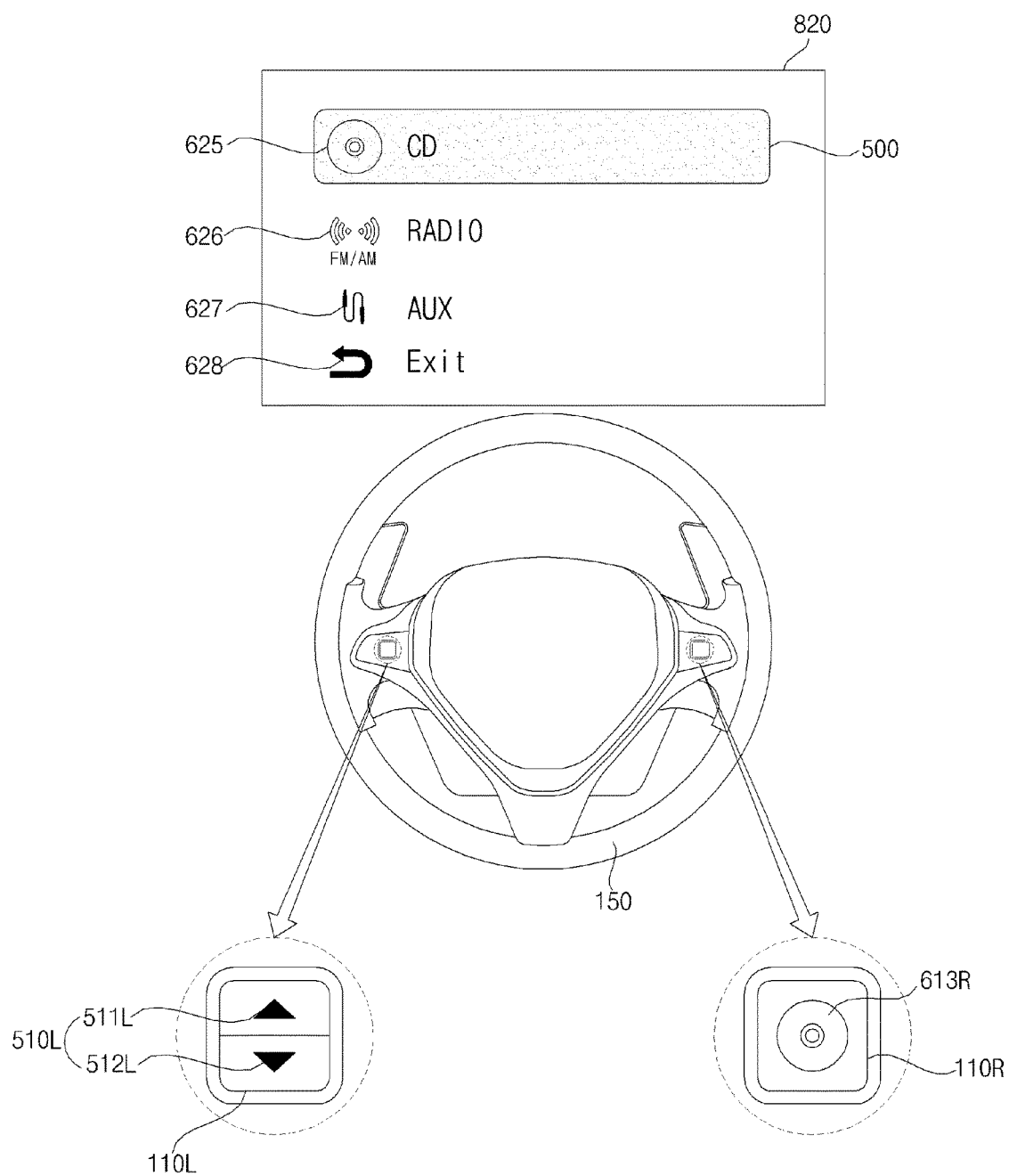

When the music item 618 is selected in FIG. 6B, music-related items may be displayed in the output area 820 as illustrated in FIG. 6D.

FIG. 6D illustrates that corresponding menu items may be displayed in the output area 820 as the second button 110R of FIG. 6B is pressed.

FIG. 6D shows an example scenario in which a CD item 625, a radio item 626, an AUX item 627, and an exit item 628 are displayed in the output area 820.

The user may select the up button 511L or the down button 512L of the up/down button 510L formed on the first button 110L and thus move to a desired item.

FIG. 6D shows an example in which the highlight bar 500 is located on the CD item 625 to highlight the CD item 625 and thus an image 613R corresponding to the CD item 625 is displayed on the second button 110R.

Figure 6E:
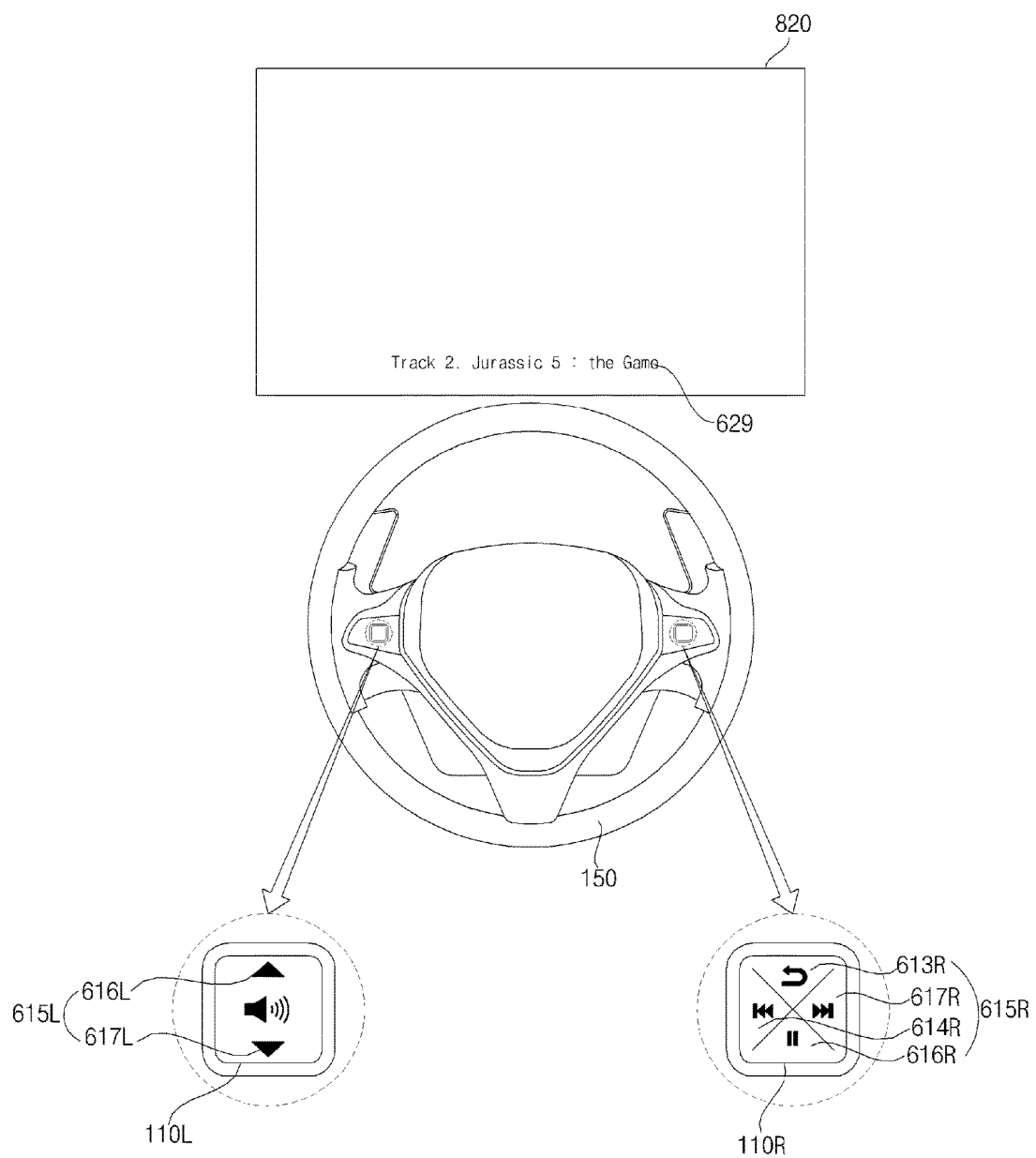

When the CD item 625 is selected in FIG. 6D, CD-related items may be displayed in the output area 820 as illustrated in FIG. 6E.

FIG. 6E illustrates that related information may be displayed in the output area 820 as the second button 110R of FIG. 6D is pressed.

As the CD item 625 is selected, the processor 170 may control one of music files stored on a CD to be played back. Specifically, a recently played music file may be played.

The processor 170 may control information related to the played music file to be displayed in the output area 820. FIG. 6E shows an example scenario in which predetermined music file information 629 is displayed.

In this case, to control the played music file, a volume up/down button 615L including a volume up button 616L and a volume down button 617L may be assigned to the first button 110L.

A four-direction button 615R including a previous menu button 613R, a previous track button 614R, a pause button 616R, and a next track button 617R may be assigned to the second button 110R. As such, the user may easily input a desired operation.

Figure 6F:
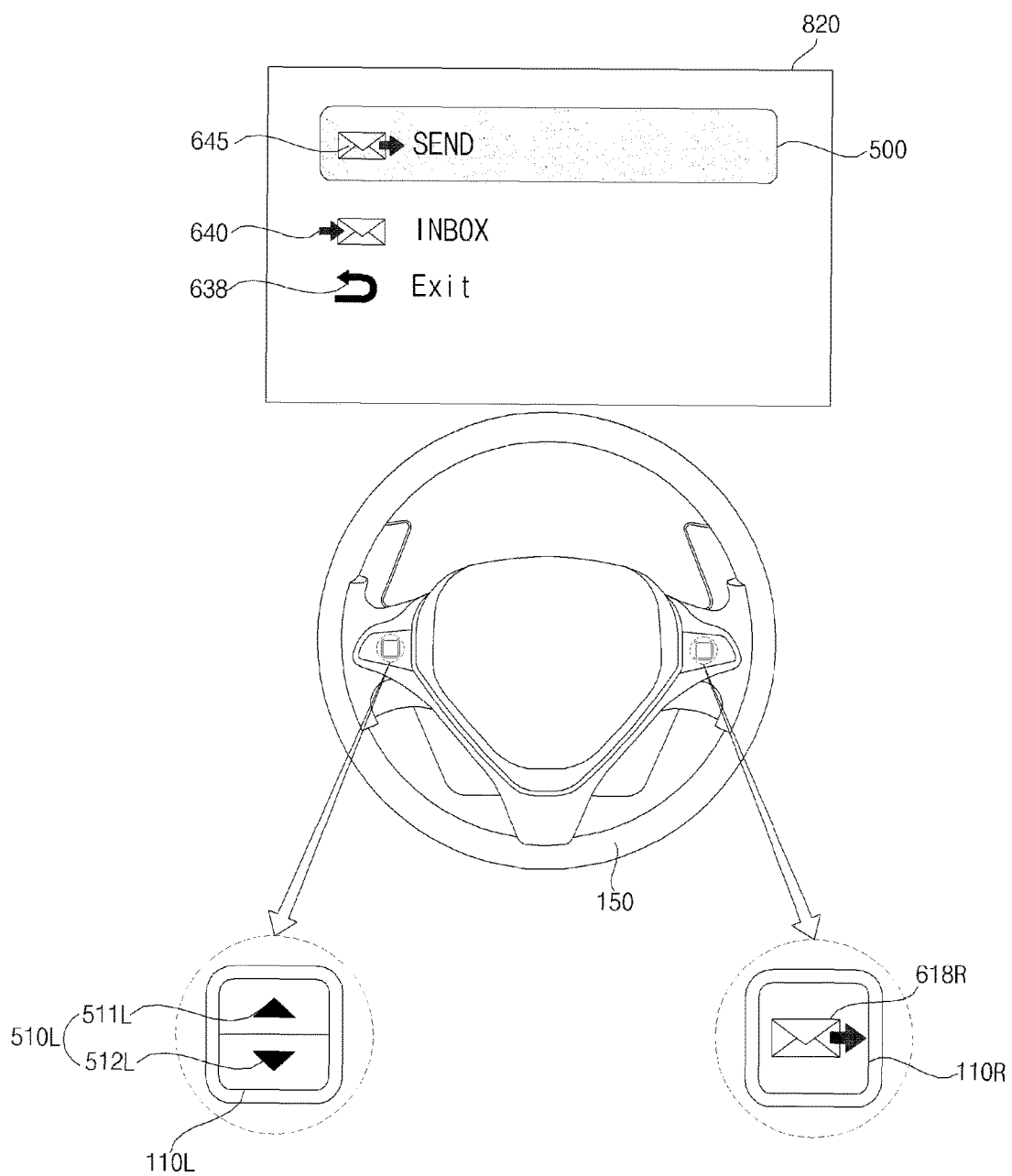

When the message item 619 is selected in FIG. 6B, message-related items may be displayed in the output area 820 as illustrated in FIG. 6F.

FIG. 6F illustrates that corresponding menu items may be displayed in the output area 820 as the second button 110R of FIG. 6B is pressed.

FIG. 6F shows an example scenario in which a send item 645, an inbox item 640, and an exit item 638 are displayed in the output area 820.

The user may select the up button 511L or the down button 512L of the up/down button 510L formed on the first button 110L and thus move to a desired item.

FIG. 6F shows an example in which the highlight bar 500 is located on the send item 645 to highlight the send item 645 and thus an image 618R corresponding to the send item 645 is displayed on the second button 110R.

Figure 7A:
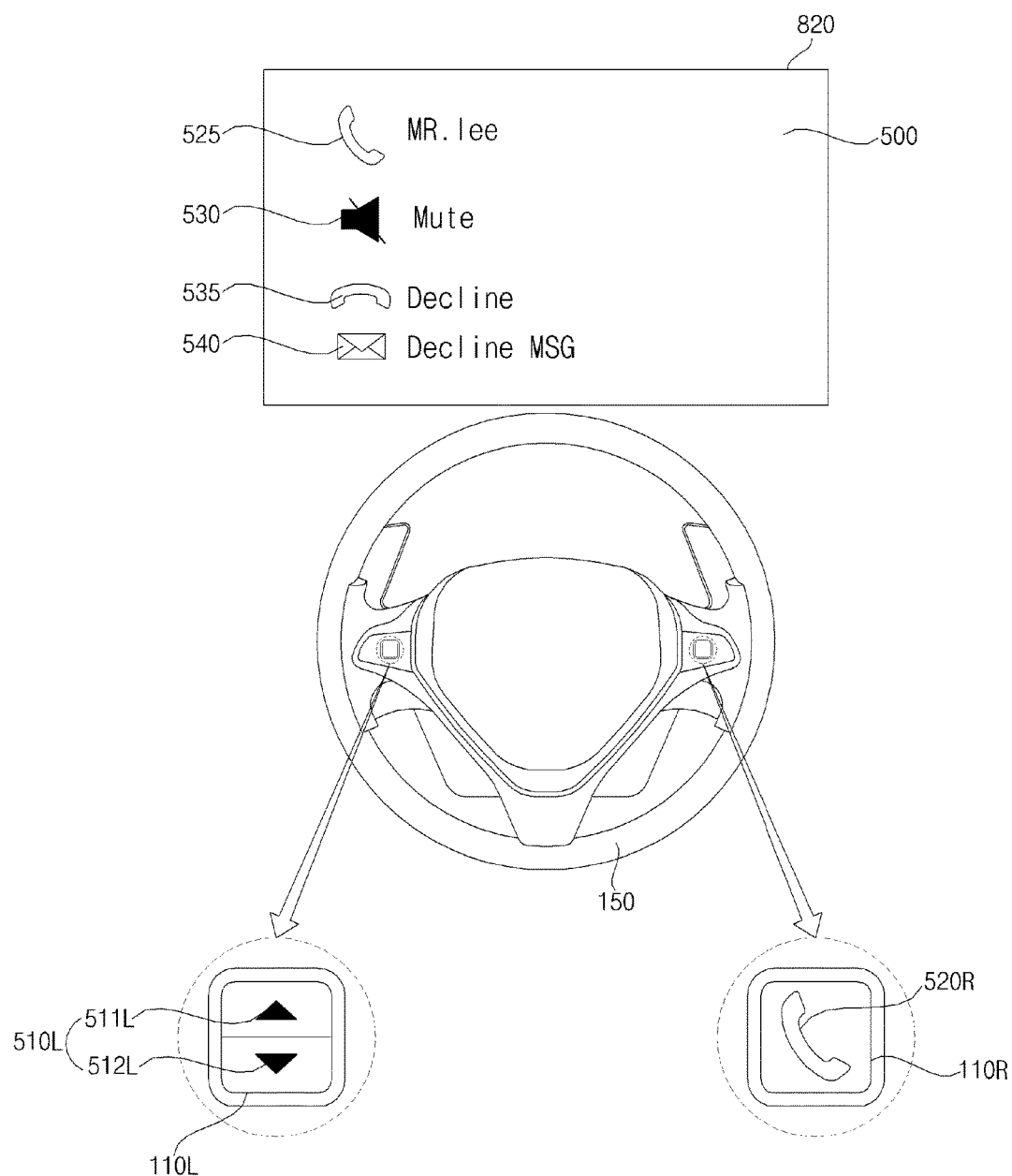
Figure 7B:
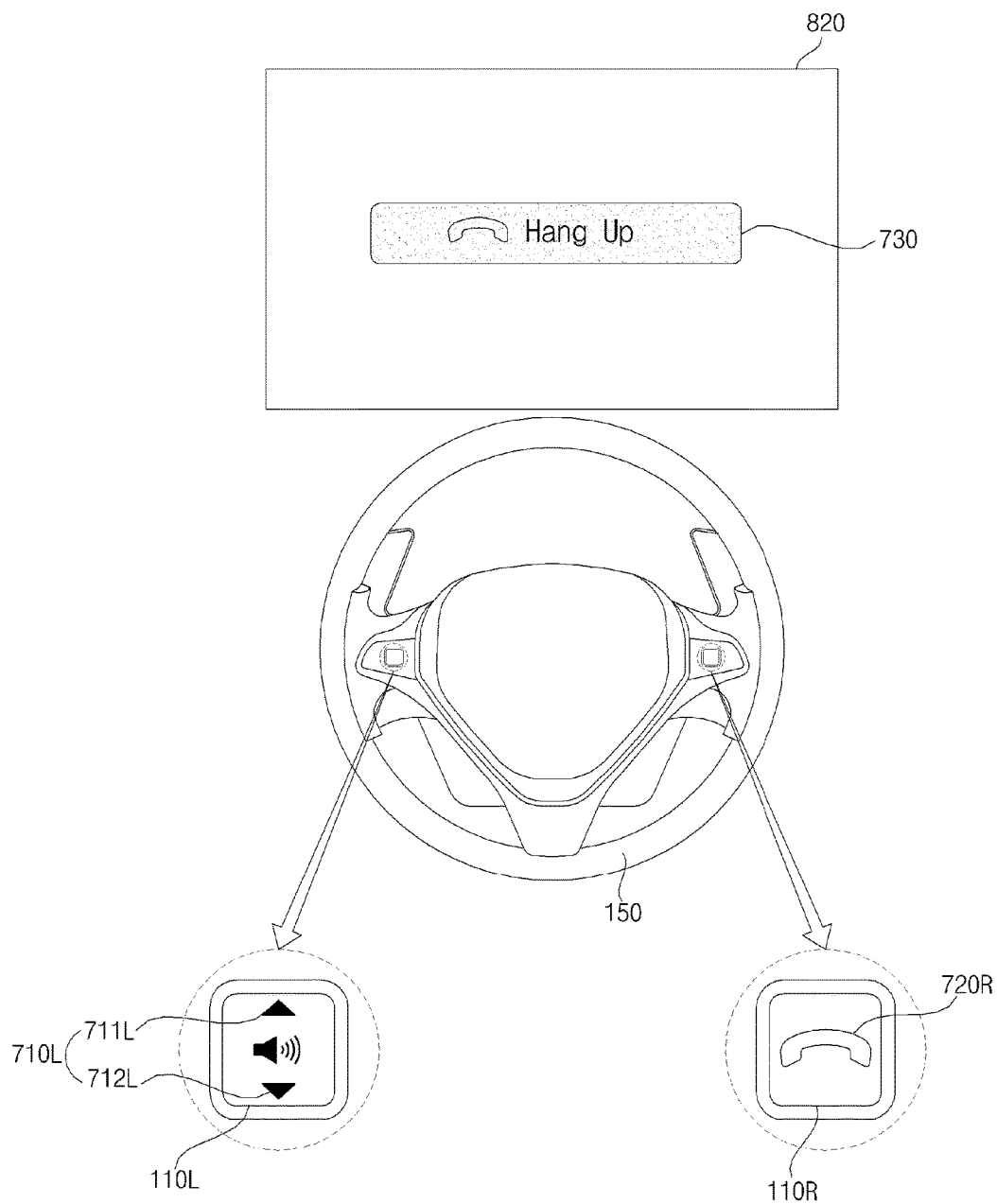
Figure 7C:
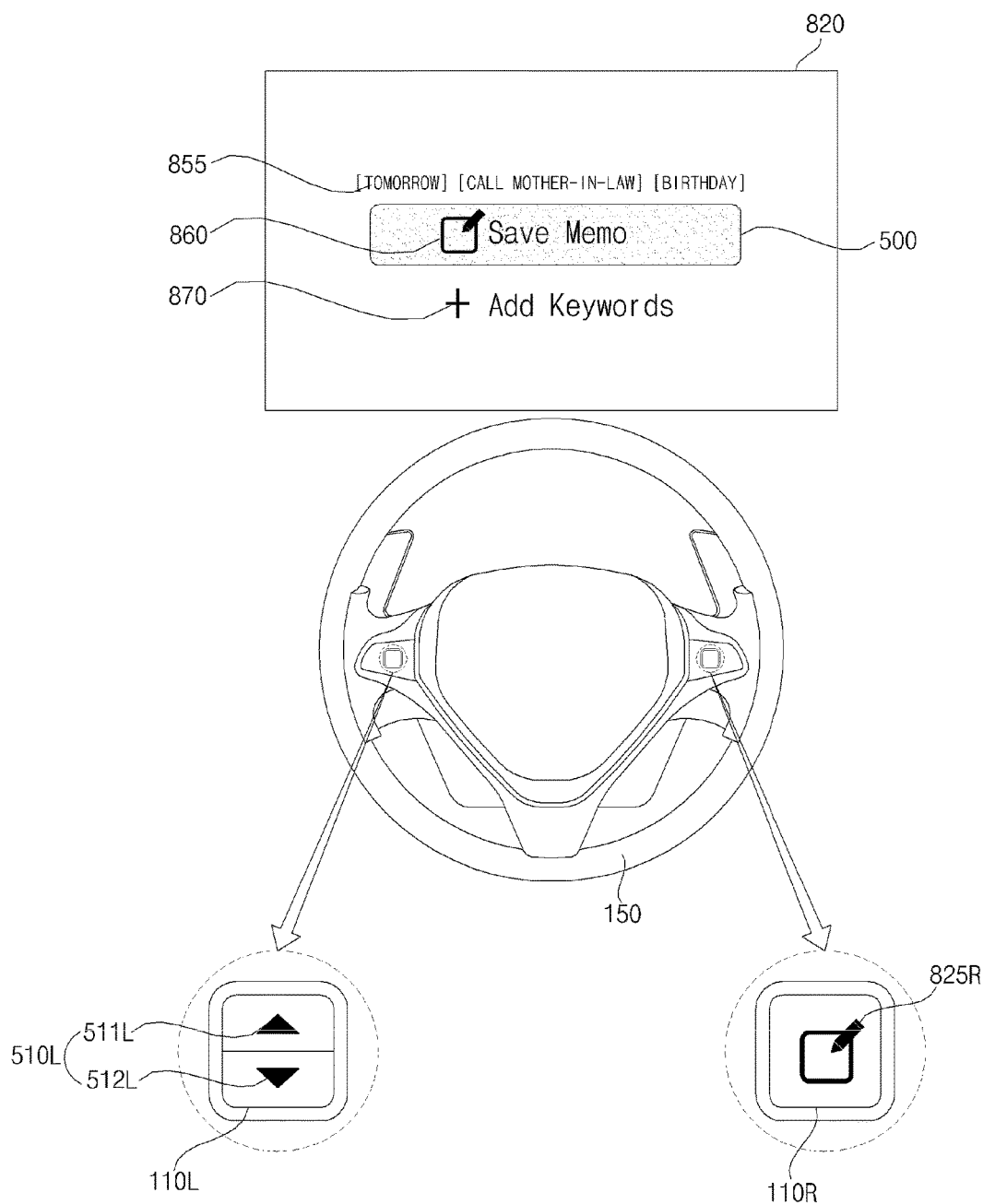

FIGS. 7A to 7C show an example operation in which the user answers a phone call while driving the vehicle 100.

FIG. 7A illustrates example operation states of the first and second buttons 110L and 110R and the display area 820 when a call is received by a mobile device of the user while driving the vehicle 100.

FIG. 7A shows an example scenario in which the answer call item 525, the mute item 530, the decline call item 535, and the decline message item 540 are displayed in the display area 820.

To enable selection of one of the items displayed in the display area 820, the processor 170 may control the first button 110L to display the image 510L including up and down buttons 511L and 511R, and control the second button 110R to display an image related to a corresponding item as the up and down buttons 511L and 511R of the first button 110L are operated.

FIG. 7A shows an example scenario in which an answer call image 520R is displayed on the second button 511R as the up and down buttons 511L and 511R of the first button 110L are operated. In this case, if the user presses the second button 511R, the answer call item 525 is selected and thus a phone call function is executed.

When the phone call function is activated, the processor 170 controls the audio input unit 183 to process and transmit voice of the user to a mobile device (not shown), and controls the audio output unit 185 to process and output voice of an opposite party received from the mobile device.

FIG. 7B illustrates operation states of the first and second buttons 110L and 110R and the display area 820 during the phone call.

FIG. 7B shows an example scenario in which a hang up item 730 is displayed in the display area 820.

Further, FIG. 7B shows an example in which a volume up/down button 710L including a volume up button 711L and a volume down button 712L is assigned to the first button 110L, and an image 720R corresponding to the hang up item 730 is displayed on the second button 110R. As such, various types of input, e.g., volume control and hang up, may be executed.

If the user presses the second button 511R, the hang up item 730 is selected and thus the phone call is ended.

FIG. 7C illustrates operation states of the first and second buttons 110L and 110R and the display area 820 after the phone call is ended.

FIG. 7C shows an example scenario in which a save memo item 860 and an add keywords item 870 are displayed in the display area 820. Further, keywords 855 extracted by analyzing the phone call are displayed.

The processor 170 may extract verbal words using a voice recognition program, extract the keywords 855 shown in FIG. 7C therefrom, and control the display 180 to display the keywords 855.

The user may select the up button 511L or the down button 512L of the up/down button 510L formed on the first button 110L and thus move to a desired item.

FIG. 7C shows an example scenario in which the highlight bar 500 is located on the save memo item 860 to be focused upon the save memo item 860 and thus an image 825R corresponding to the save memo item 860 is displayed on the second button 110R. As such, a save memo function after the phone call is ended may be executed.

Figure 8A:
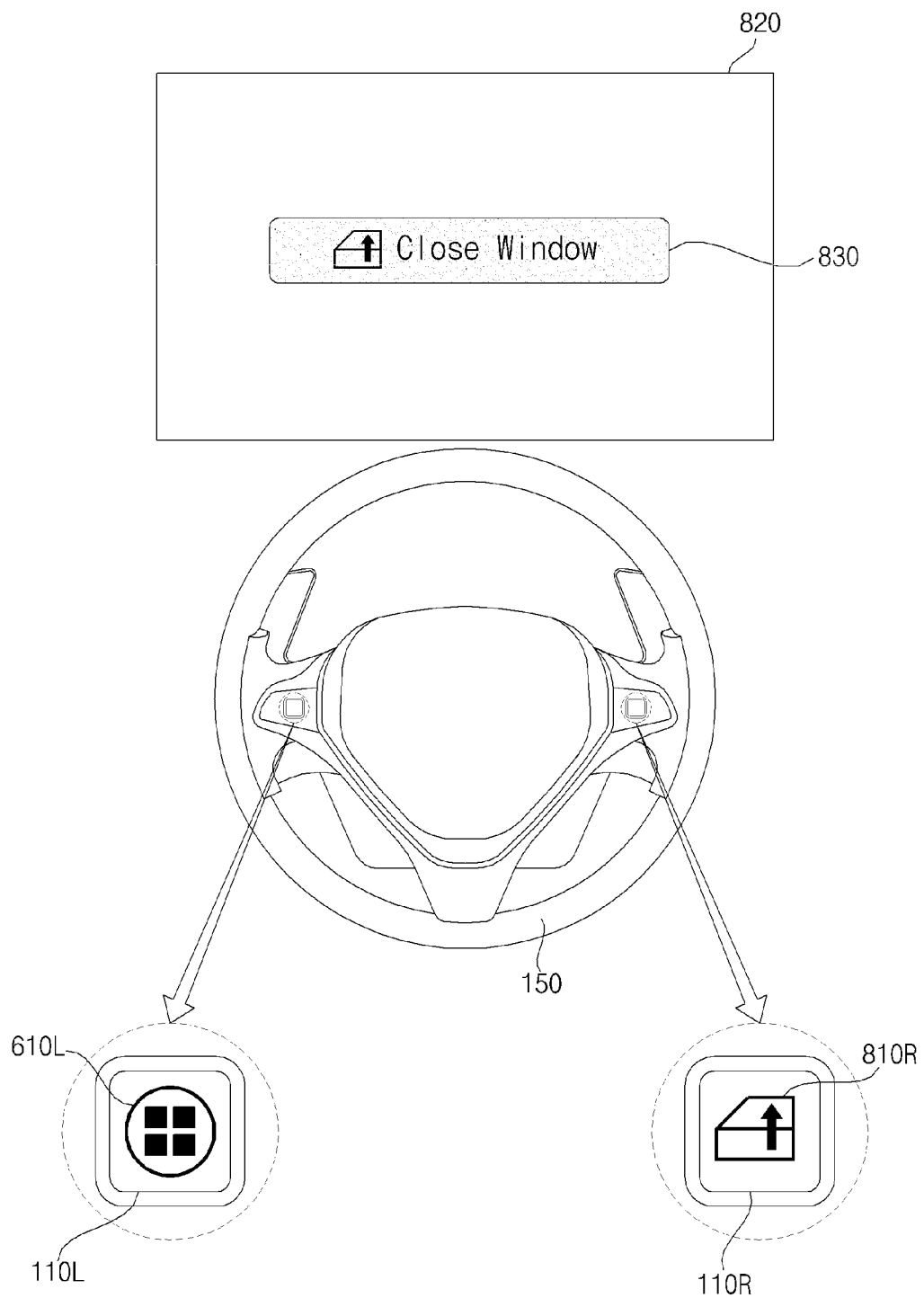

FIG. 8A illustrates that a message indicating to close windows of the vehicle 100 may be displayed in the output area 820 when a tunnel entrance event occurs.

The processor 170 may recognize that a tunnel is ahead based on GPS information and map information and correspondingly cause a message instructing the driver to close the windows of the vehicle 100 to be displayed.

Specifically, along with the message, the processor 170 may control a close window function to be assigned to the second button 110R and control an image 810R corresponding to the close window function to be displayed.

As such, the user may close the windows of the vehicle 100 before entering the tunnel by merely pressing the second button 110R.

Alternatively, a tunnel entrance mode function may be assigned to the second button 110R and thus a function of turning on headlamps and a function of activating indoor air circulation as well as the function of closing the windows of the vehicle 100 may be executed.

Upon a tunnel exit event, a message prompting returning the windows to previous states may be displayed similarly as illustrated in FIG. 8A.

A corresponding function may be assigned to the second button 110R and thus the windows may be controlled to be open to the previous states.

Figure 8B:
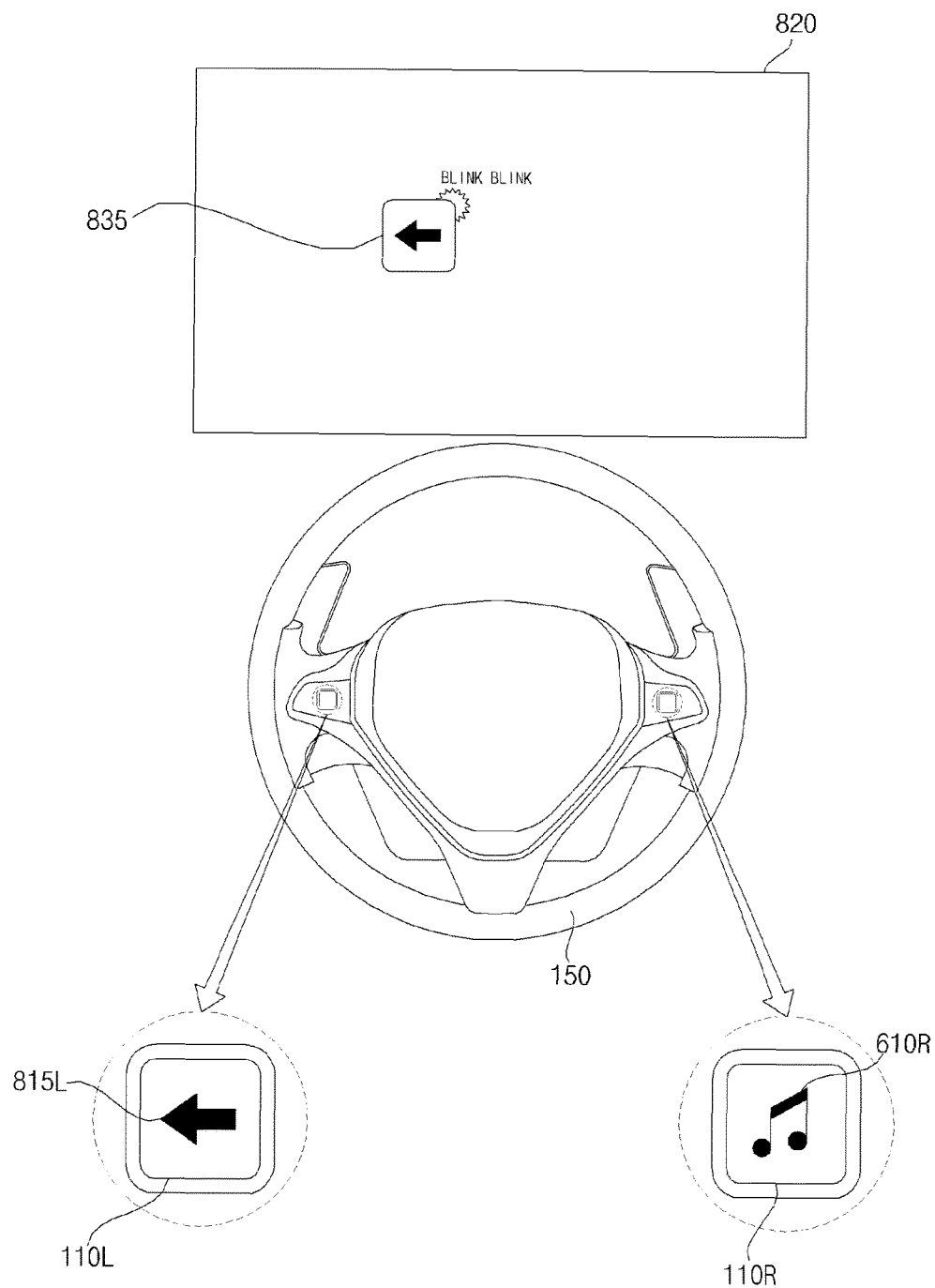

FIG. 8B illustrates that a turn signal function may be assigned to the first button 110L.

For example, if route guidance information is received from a navigation device and a left turn should be made, the processor 170 may control a button 815L for activating a left lamp to be assigned to the first button 110L which is disposed at the left side.

Along with this, a left lamp blinking image 835 may be displayed in the output area 820.

For a right turn, a button for activating a right lamp may be assigned to the second button 110R.

Figure 9A:
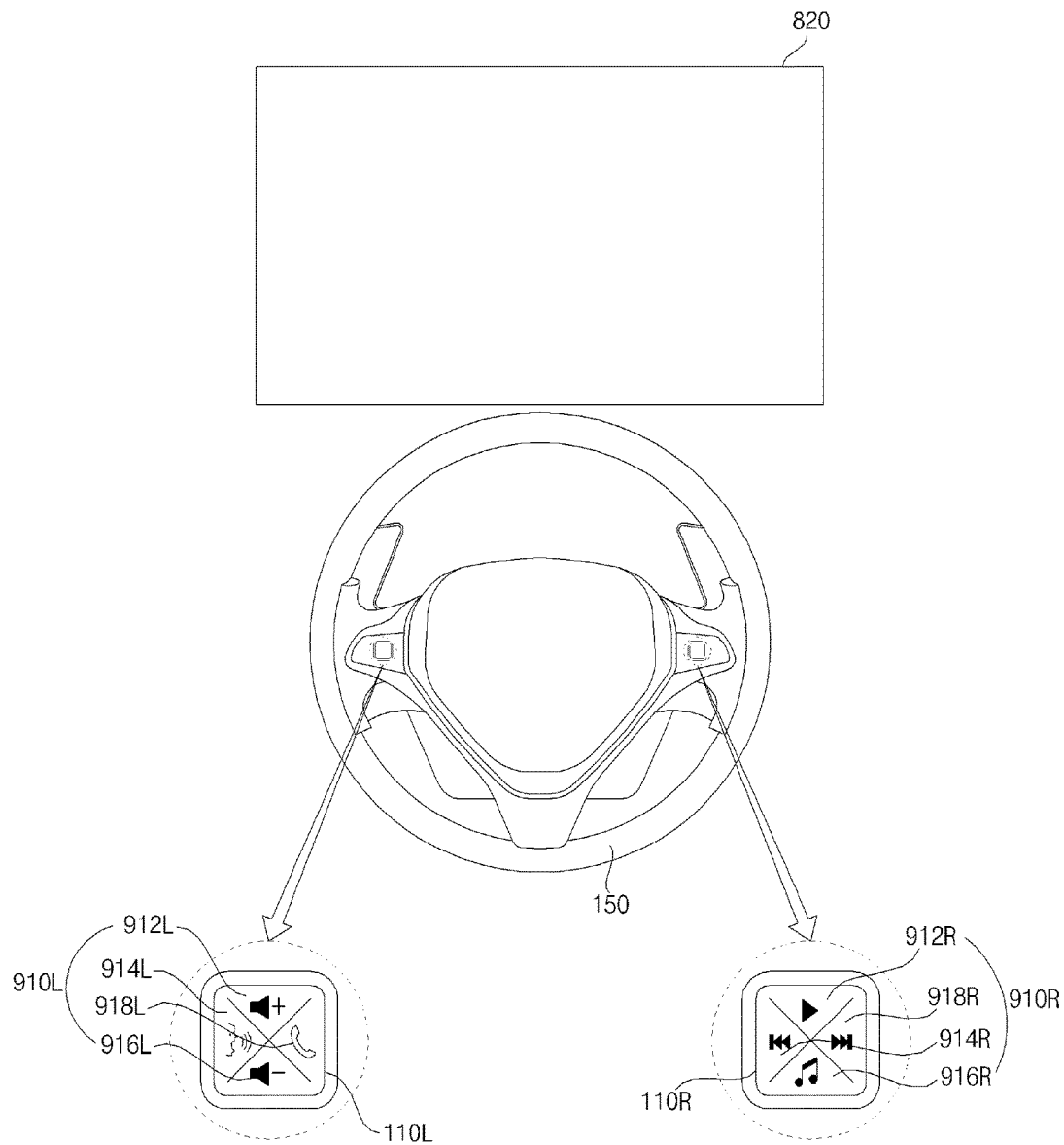

FIG. 9A shows an example scenario in which a four-direction button 910L is assigned to the first button 110L and a four-direction button 910R is assigned to the second button 110R by default if no event occurs while driving the vehicle 100.

FIG. 9A illustrates that no event occurs and thus nothing may be displayed in the output area 820.

FIG. 9A shows an example scenario in which a volume up button 912L, a voice command/menu call button 914L, a volume down button 916L, and a phone button 918L are assigned to the first button 110L, while a play/pause button 912R, a previous track button 914R, a change source button 916R, and a next track button 918R are assigned to the second button 110R.

If a finger touches the first button 110L or the second button 110R, the processor 170 may control a corresponding image to be displayed in the output area 820.

Figure 9B:
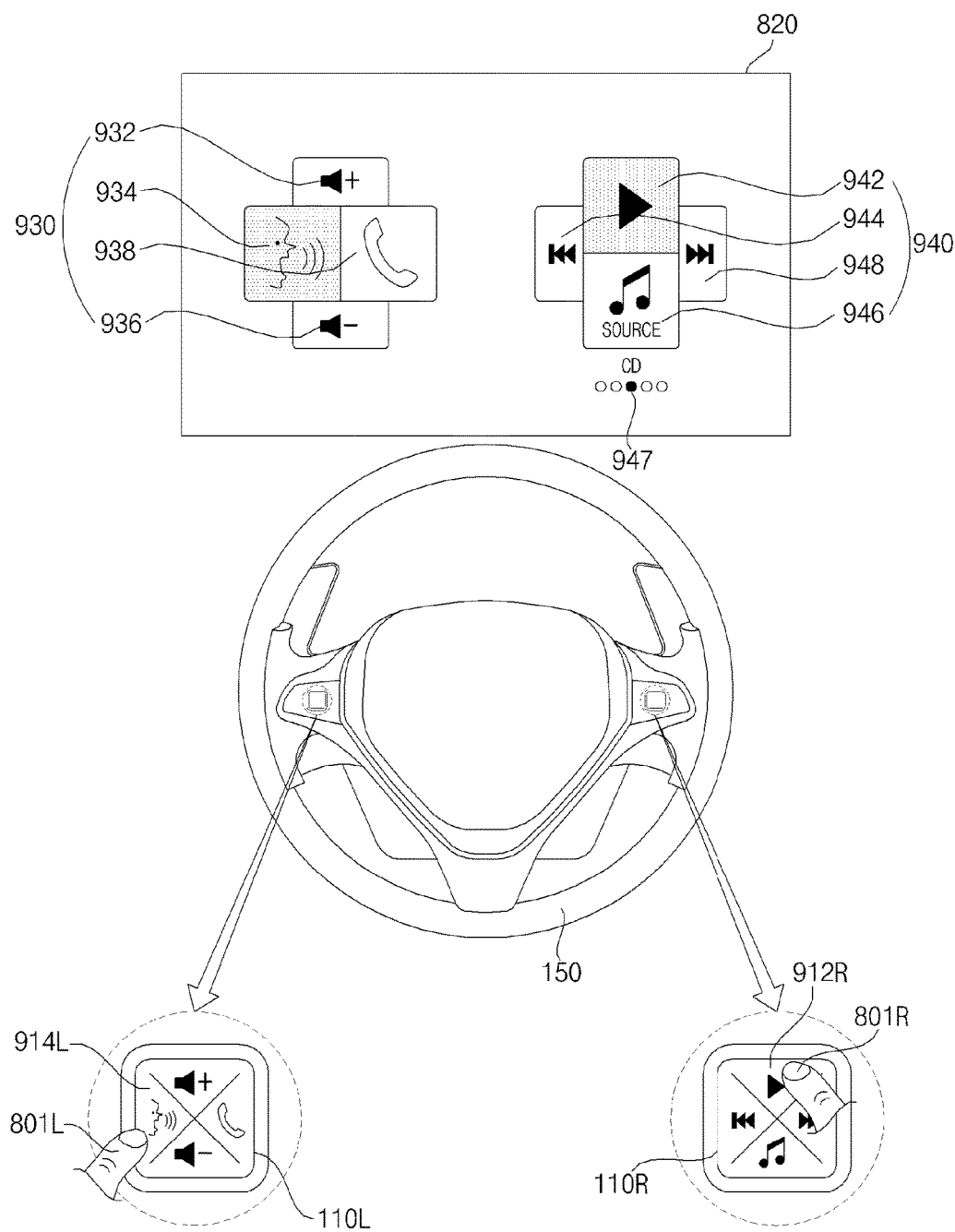

FIG. 9B illustrates that the first and second buttons 110L and 110R are touched and thus first and second images 930 and 940 are displayed in the output area 820, respectively.

FIG. 9B shows an example scenario in which the first image 930 including a volume up image 932, a voice command/menu call image 934, a volume down image 936, and a phone image 938 is displayed in a left part of the output area 820 corresponding to the first button 110L.

Further, FIG. 9B shows an example scenario in which the second image 940 including a play/pause image 942, a previous track image 944, a change source image 946, and a next track image 948 is displayed in a right part of the output area 820 corresponding to the second button 110R.

FIG. 9B illustrates that the voice command/menu call image 934 may be highlighted to correspond to the location of a finger 801L of the left hand, and the play/pause image 942 may be highlighted to correspond to the location of a finger 801R of the right hand.

Figure 9C:
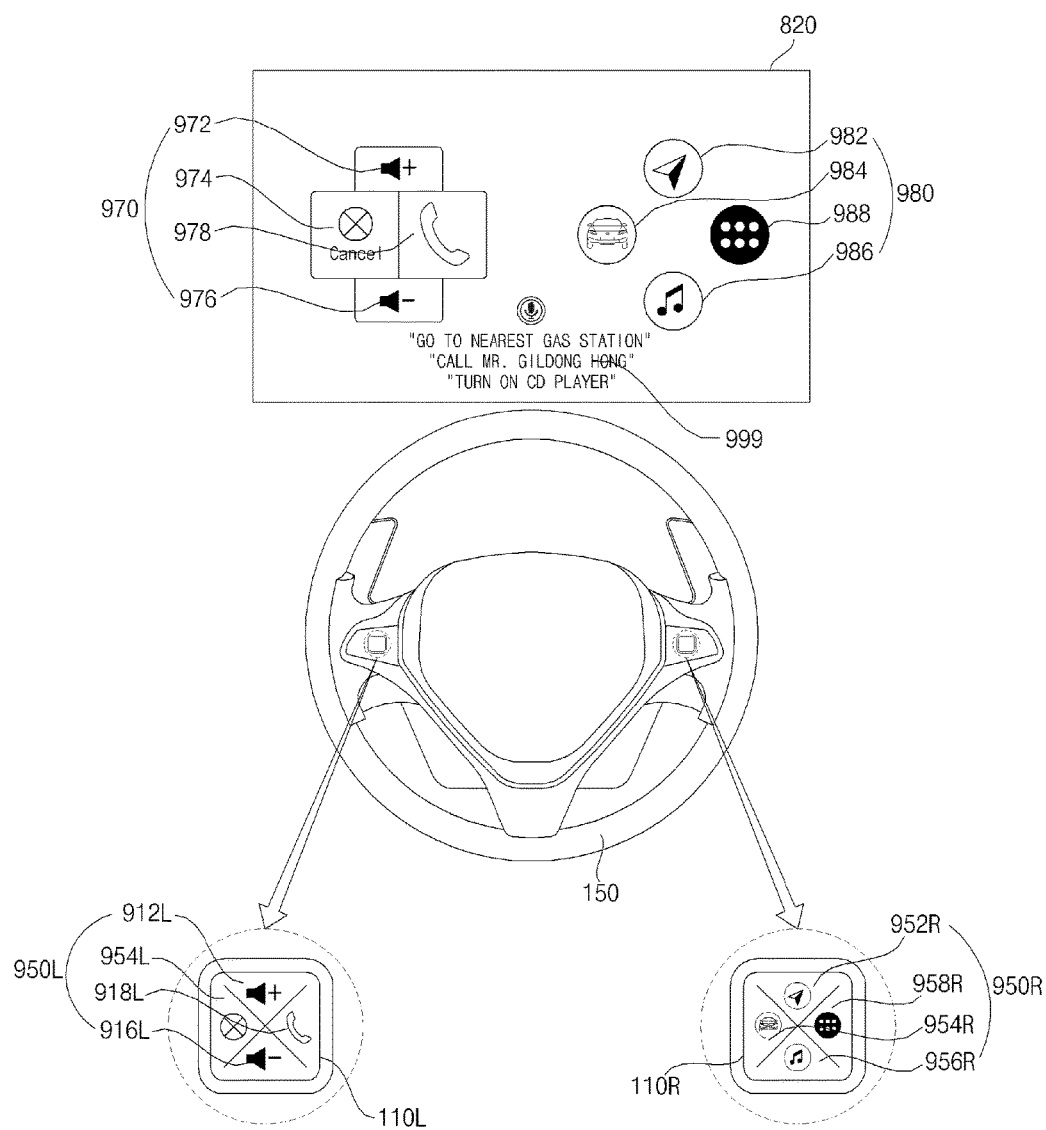

FIG. 9C illustrates that a voice command function may be activated if the voice command/menu call button 914L of the first button 110L is pressed.

Compared to the first button 110L of FIG. 9B, FIG. 9C shows an example scenario in which a four-direction button 950L including a cancel voice command button 954L instead of the voice command/menu call button 914L is displayed.

Further, FIG. 9C shows an example scenario in which a first image 970 including a cancel voice command image 974 instead of the voice command/menu call image 934L is displayed in a left part of the output area 820 corresponding to the first button 110L.

When a voice command function is activated, to designate a target of a voice command, buttons for setting the target may be assigned to the second button 110R.

If a voice command is issued, the voice command may be displayed as a text image 999 at a bottom part of the output area 820 as illustrated in FIG. 9C.

FIG. 9C shows an example scenario in which a four-direction button 950R including a navigation item 952R, a car item 954R, a media item 956R, and an application item 958R is assigned to the second button 110R.

As such, FIG. 9C shows an example scenario in which a second image 980 including a navigation image 982, a car image 984, a media image 986, and an application image 988 is displayed in a right part of the output area 820 corresponding to the second button 110R.

Figure 9D:
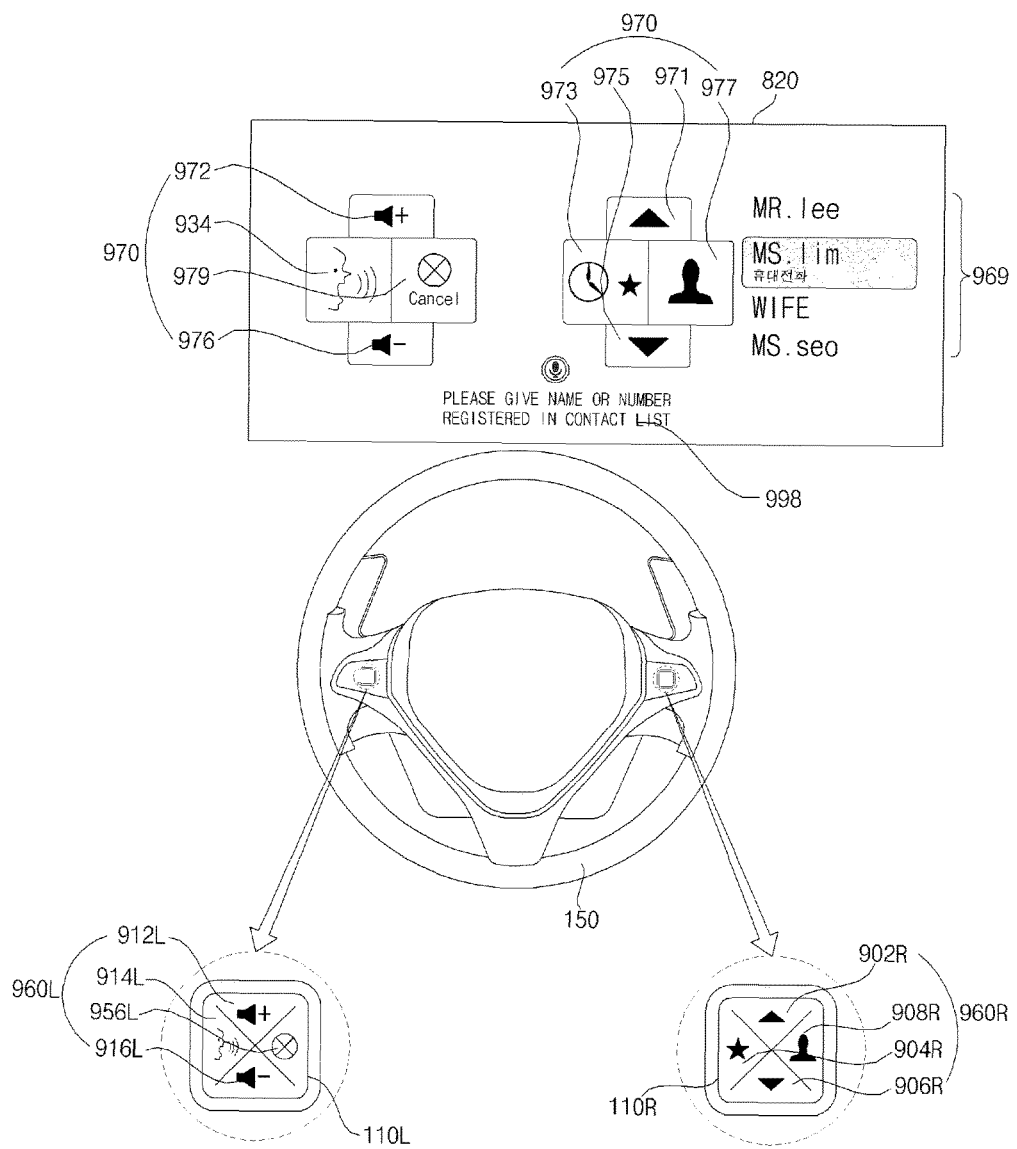

FIG. 9D illustrates that a phone function may be activated when the phone button 918L of the first button 110L is pressed.

In contrast to the first button 110L of FIG. 9B, FIG. 9D shows an example scenario in which a four-direction button 960L including a cancel call button 956L instead of the phone button 918L is displayed.

Further, FIG. 9D shows an example scenario in which the first image 970 including a cancel call image 979 instead of the phone image 938 is displayed in a left part of the output area 820 corresponding to the first button 110L.

When a phone function is activated, to designate a target of phone calling, buttons for setting the target may be assigned to the second button 110R.

FIG. 9D shows an example scenario in which a four-direction button 960R including an up item 902R, a favorites item 904R, a down item 906R, and a phone item 908R is assigned to the second button 110R.

As such, FIG. 9D shows an example scenario in which the second image 980 including an up image 971, a favorites image 973, a down image 975, and a phone image 977 is displayed in a right part of the output area 820 corresponding to the second button 110R.

A contacts item 969 including a plurality of targets of phone calling may be displayed at the right side of the second image 980. Accordingly, the user may move to a desired target of phone calling in the contacts item 969 by selecting the up item 902R or the down item 906R of the second button 110R.

When a phone function is activated, a guide message 998 for designating a target of phone calling may be displayed at a bottom part of the output area 820 as illustrated in FIG. 9D.

Figure 9E:
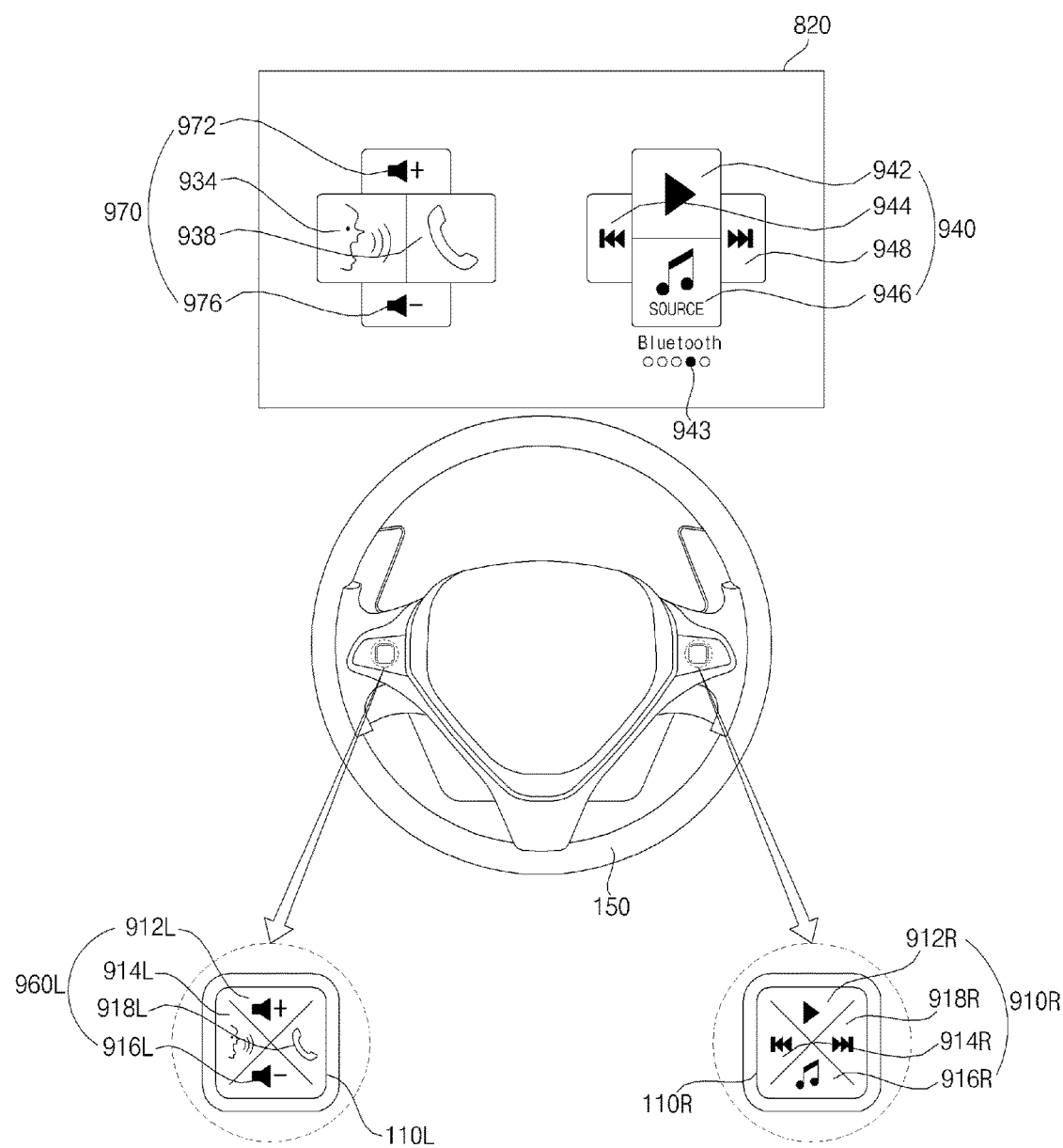

FIG. 9E is similar to FIG. 9B and illustrates that the change source button 916R of the second button 110R is pressed.

FIG. 9E shows an example scenario in which an object 943 indicating that a Bluetooth item is selected as a media source is displayed in the output area 820.

Figure 9F:
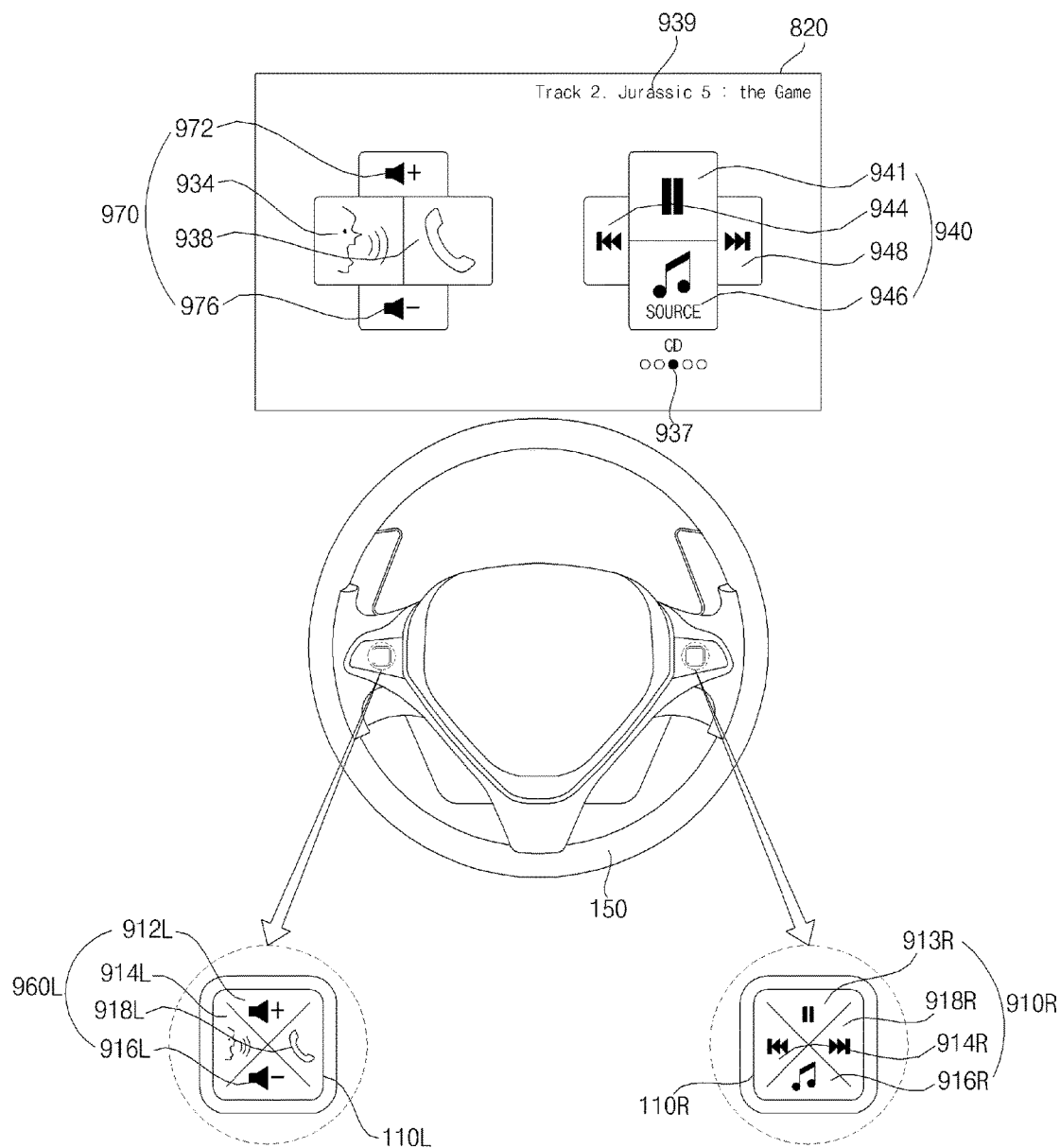

FIG. 9F is similar to FIG. 9B and illustrates that the play/pause button 912R of the second button 110R is pressed.

As such, a pause button 913R may be displayed instead of a play button 912R of the second button 110R, and the second image 940 including a pause image 941 instead of the play image 942 may be displayed in the output area 820.

Played music file information 939 may be displayed in the output area 820.

Figure 10A:
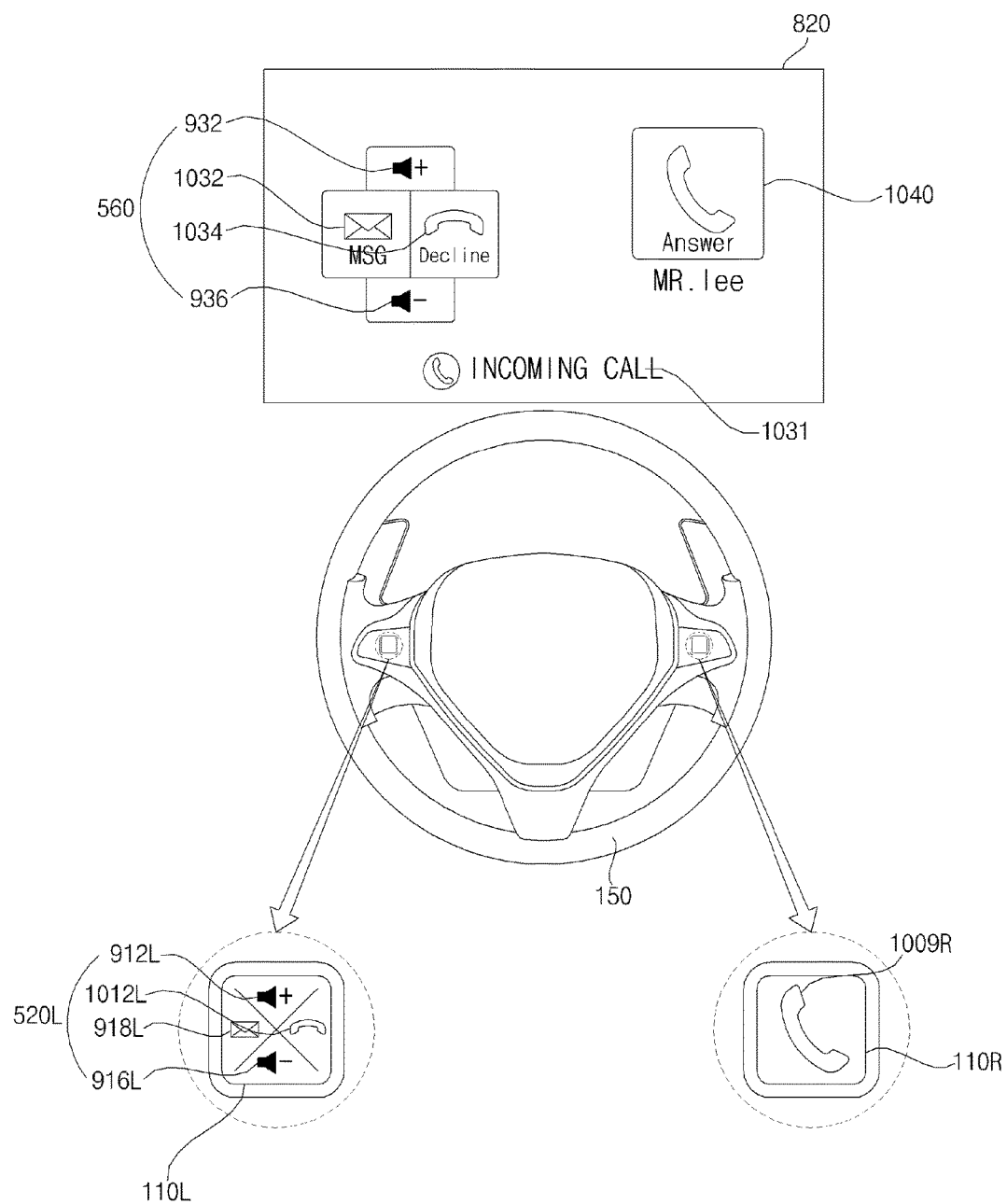

FIG. 10A illustrates operation states of the first and second buttons 110L and 110R and the display area 820 when a call is received by a mobile device of the user.

FIG. 10A shows an example scenario in which the volume up button 912L, a message button 918L, the volume down button 916L, and a hang up button 1012L are assigned to the first button 110L, while an answer call button 1009R is assigned to the second button 110R.

FIG. 10A shows an example in which a first image 560 including the volume up image 932, a message image 1032, the volume down image 936, and a decline call image 1034 is displayed in a left part of the display area 820 corresponding to the first button 110L, while an answer call image 1040 is displayed in a right part of the display area 820 corresponding to the second button 110R.

An incoming call message 1031 may be further displayed in the display area 820.

As such, the user may perform various operations, e.g., answering a call, declining a call, etc.

When the user presses the second button 110R, a phone call is answered. Button assignment during the phone call is as illustrated in FIG. 10B.

Figure 10B:
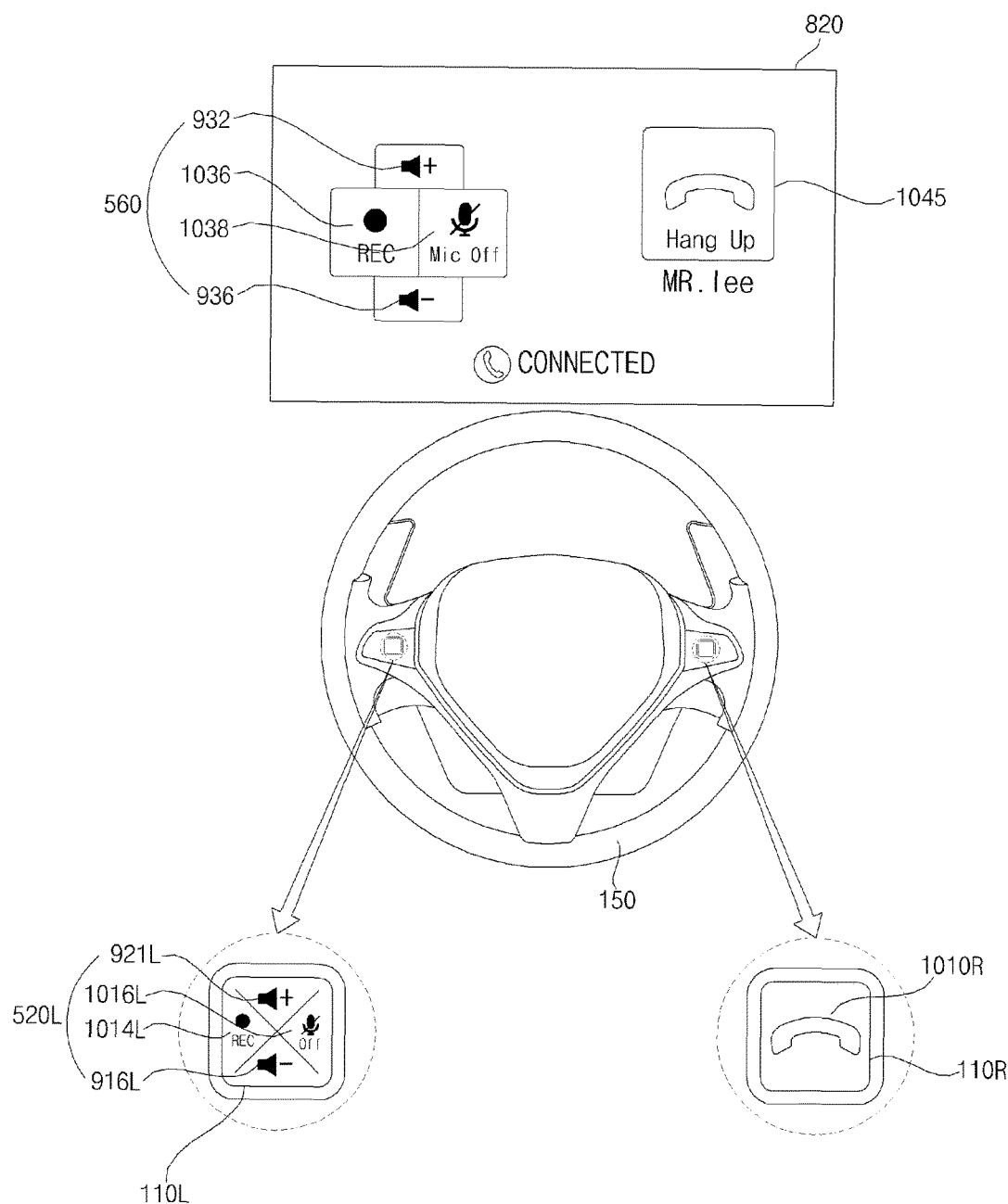

FIG. 10B illustrates operation states of the first and second buttons 110L and 110R and the display area 820 during the phone call.

Compared to FIG. 10A, FIG. 10B shows an example scenario in which a record button 1014L and a microphone off button 1016L are assigned to the first button 110L instead of the message button 918L and the hang up button 1012L, respectively, and a hang up button 1010R is assigned to the second button 110R.

When the user presses the second button 511R, the hang up item 730 is selected and thus the phone call is ended.

Figure 10C:
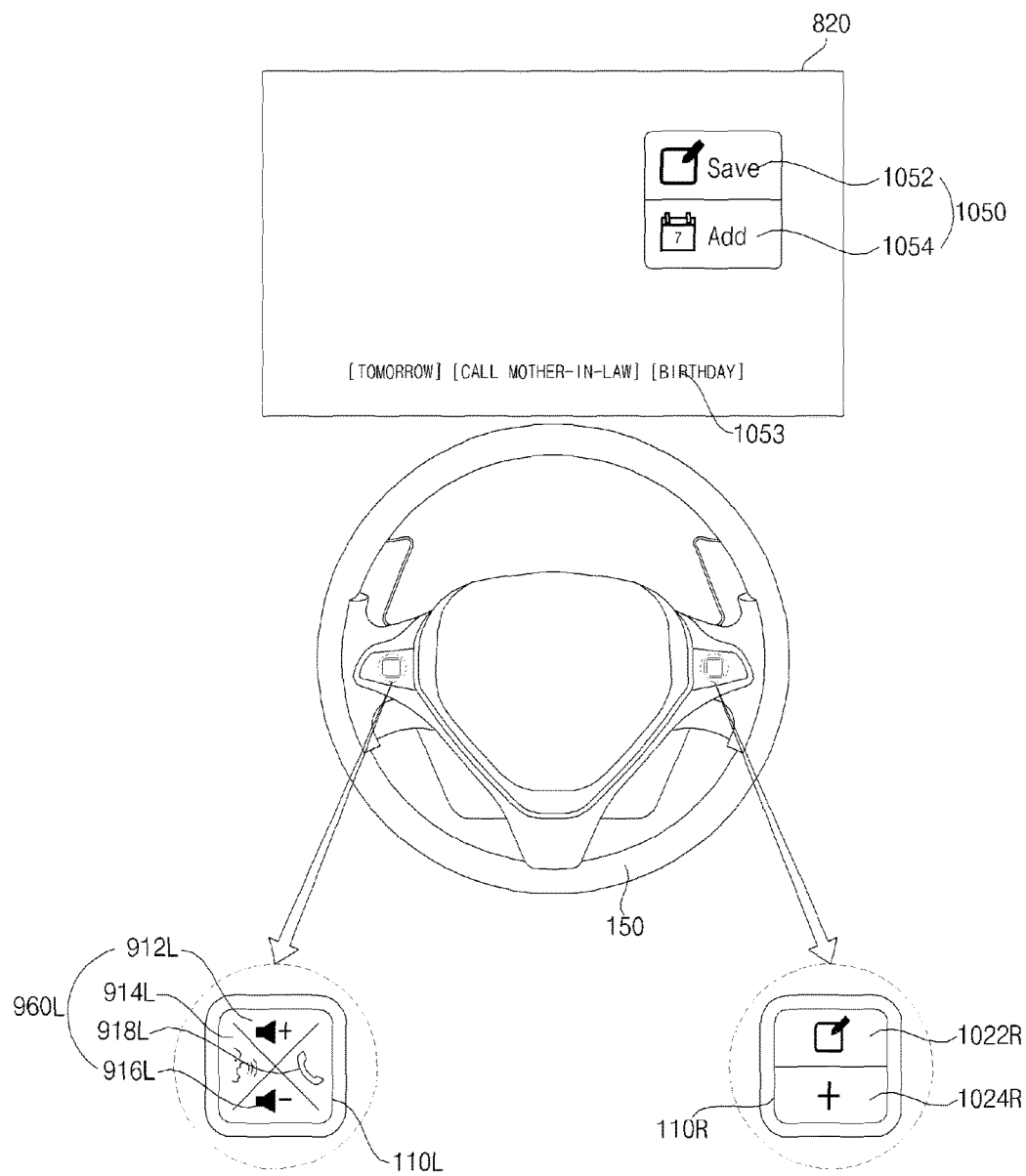

FIG. 10C illustrates operation states of the first and second buttons 110L and 110R and the display area 820 after the phone call is ended.

FIG. 10C shows an example scenario in which the volume up button 912L, the voice command/menu call button 914L, the volume down button 916L, and the phone button 918L are assigned to the first button 110L, while a save memo button 1022R and an add keywords button 1024R are displayed on the second button 110R.

FIG. 10C shows an example scenario in which a save memo item 1052 and an add keywords item 1054 are displayed in a right part of the display area 820. Further, keywords 1053 extracted by analyzing the phone call may be displayed. As such, a save memo function after the phone call is ended may be executed.

The processor 170 may extract verbal words using a voice recognition program, extract the keywords 1053 shown in FIG. 10C therefrom, and control the display 180 to display the keywords 1053.

Figure 10D:
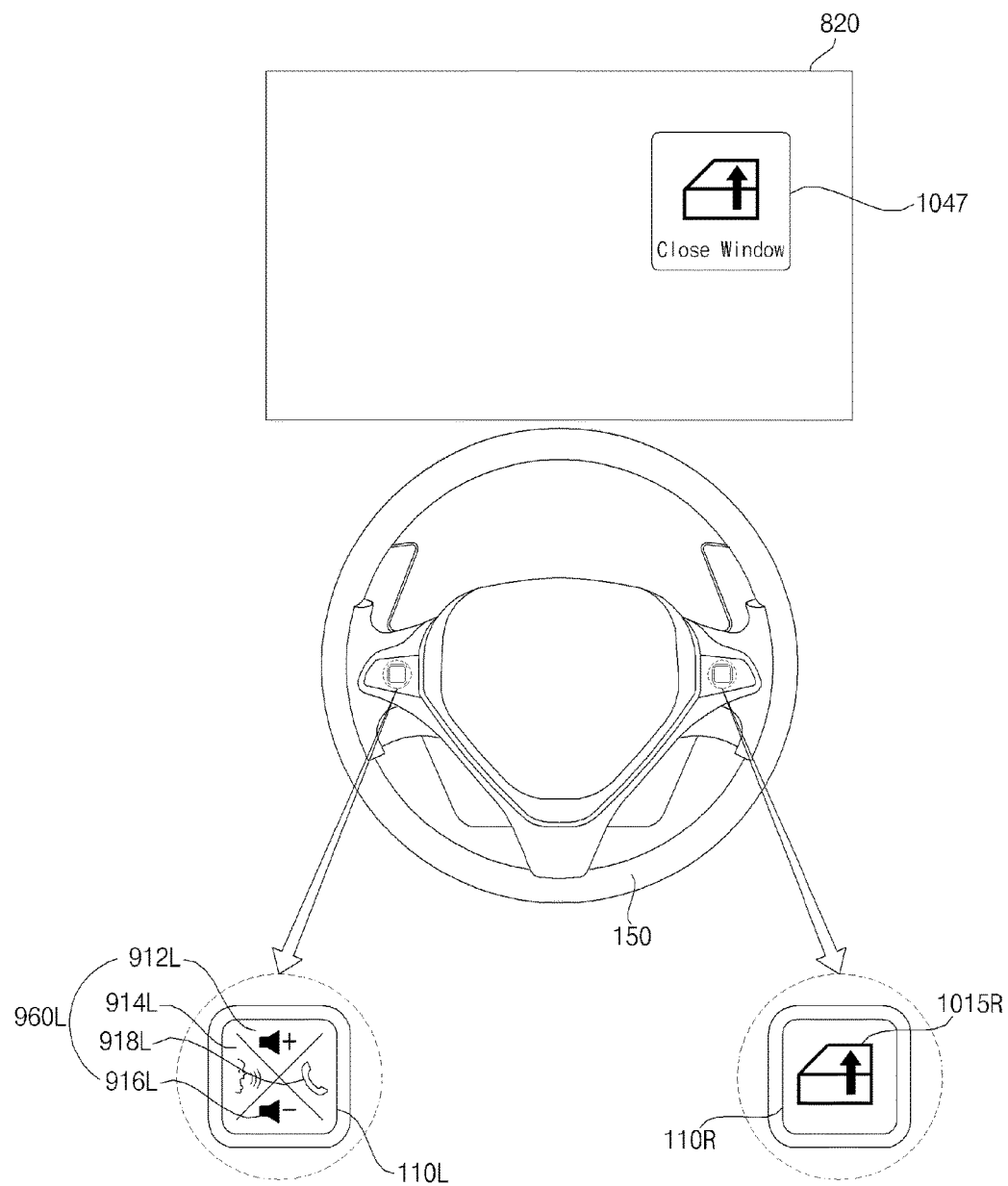

FIG. 10D illustrates that a message indicating to close windows of the vehicle 100 is displayed in the output area 820 when a tunnel entrance event occurs.

The processor 170 may recognize a tunnel ahead based on GPS information and map information and cause the message prompting closing of the windows of the vehicle 100 to be displayed.

Specifically, along with the message, the processor 170 may control the function of a close window button 1015R to be assigned to the second button 110R and control an image 810R corresponding to the function to be displayed.

As such, the user may close the windows of the vehicle 100 before entering the tunnel by merely pressing the second button 110R.

Alternatively, a tunnel entrance mode function may be assigned to the second button 110R and thus a function of turning on headlamps and a function of activating indoor air circulation as well as the function of closing the windows of the vehicle 100 may be executed.

Upon a tunnel exit event, a message prompting returning the windows to previous states may be displayed similarly as in FIG. 10D.

A corresponding function may be assigned to the second button 110R and thus the windows may be controlled to be open to the previous states.

Figure 10E:
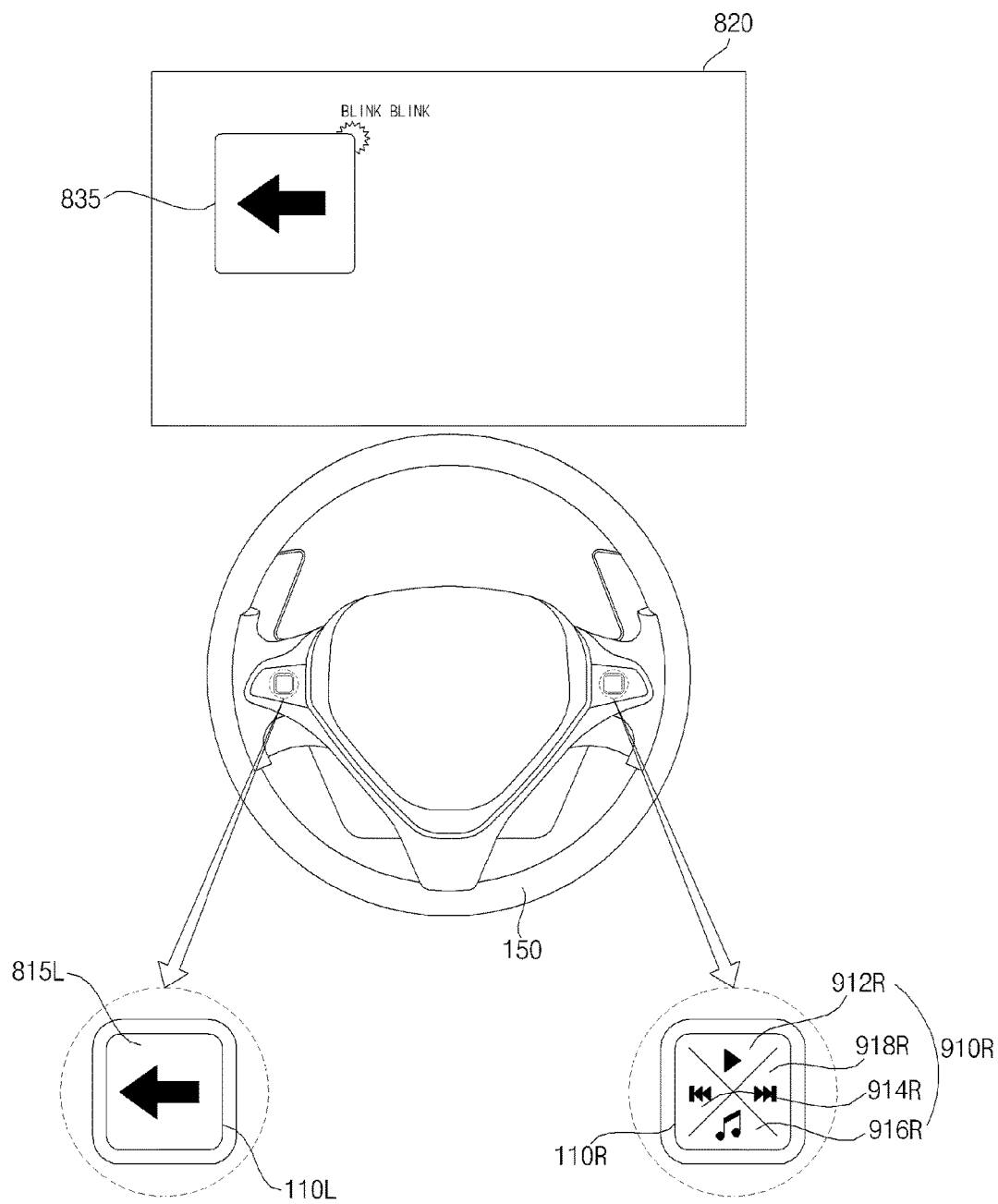

FIG. 10E illustrates that a turn signal function may be assigned to the first button 110L.

For example, if route guidance information is received from a navigation device and a left turn should be made, the processor 170 may control a button 815L for activating a left lamp to be assigned to the first button 110L which is disposed at the left side.

Along with this, a left lamp blinking image 835 may be displayed in the output area 820.

For a right turn, a button for activating a right lamp may be assigned to the second button 110R.

When a selective item is displayed on a navigation device, the processor 170 may receive information related to the selective item via the interface 130 and control buttons for making a selection on the selective item to be displayed on at least one of a plurality of buttons. A detailed description thereof is now given with reference to FIGS. 11A and 11B.

Figure 11A:
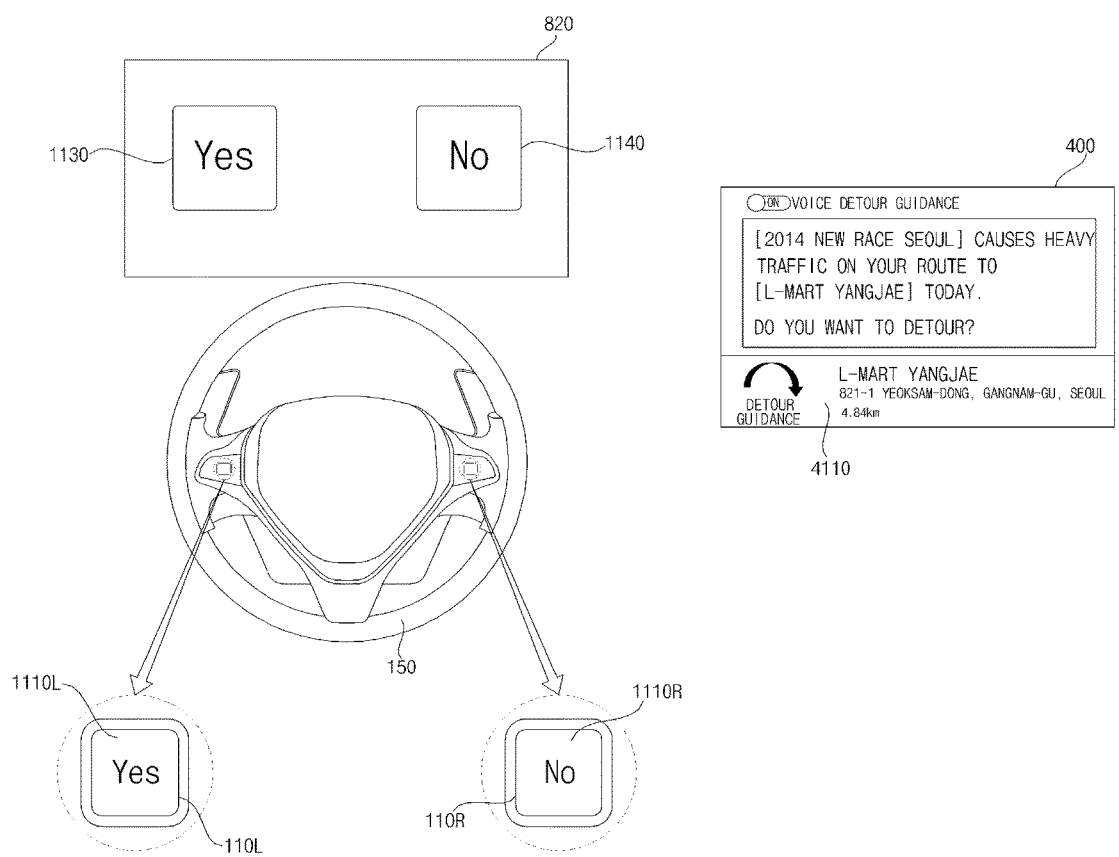

FIG. 11A illustrates that route guidance information 4110 is displayed on a navigation device 400. Specifically, FIG. 11A illustrates that a selective item for route guidance is displayed.

In this case, the processor 170 may receive information related to the selective item via the interface 130 and control a yes button 1110L and a no button 1110R to be respectively assigned to the first and second buttons 110L and 110R. Further, a yes image 1130 and a no image 1140 may be displayed in the output area 820. As such, the navigation device 400 may be easily controlled by merely manipulating the input unit 110 without separately manipulating the navigation device 400 while driving FIG. 11B illustrates that various selective items are displayed in the output area 820 when the first button 110L corresponding to the yes button 1110L of FIG. 11A is pressed.

Figure 11B:
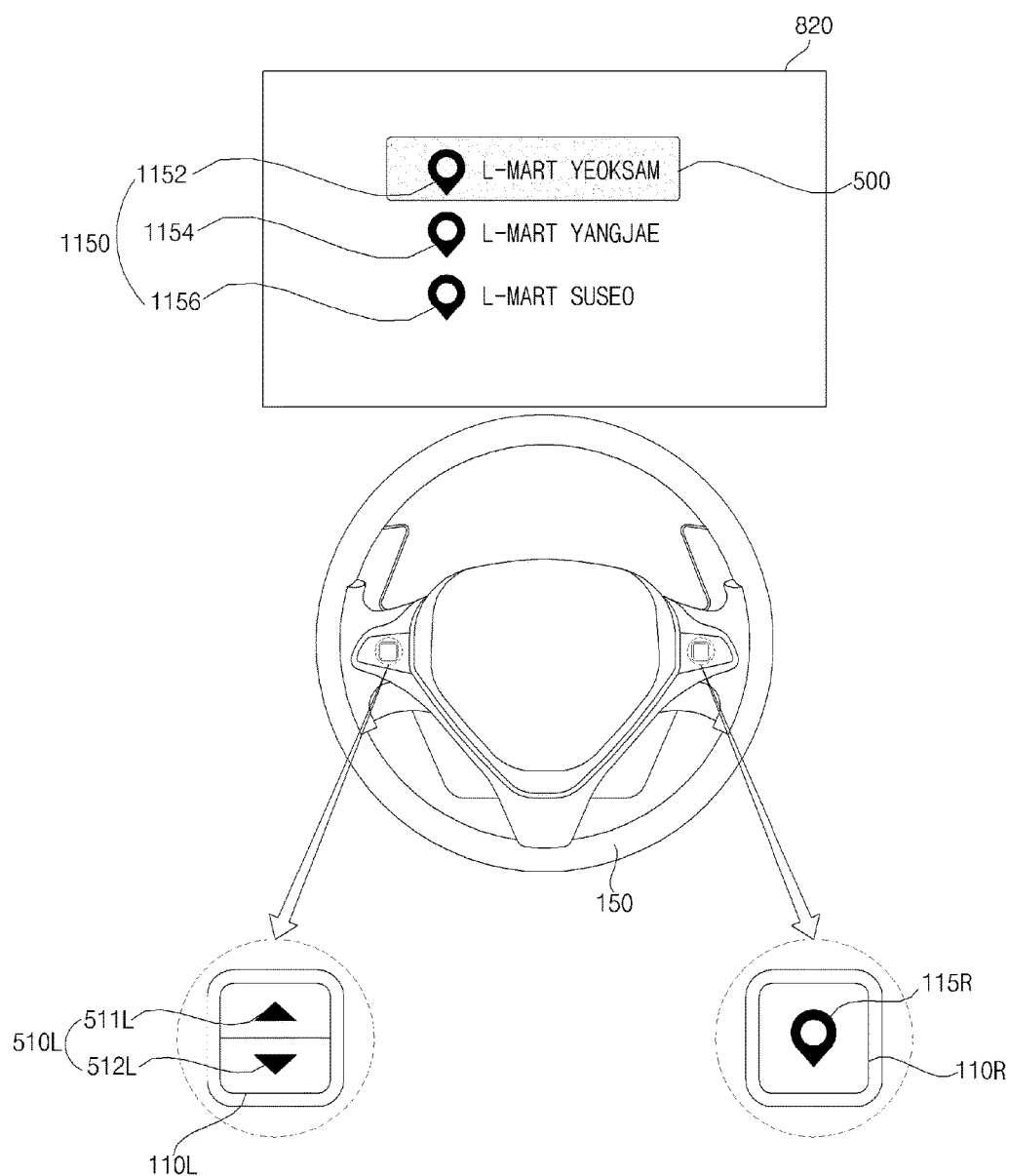

FIG. 11B exemplarily shows an image 1150 including a plurality of destination items 1152, 1154 and 1156, and the highlight bar 500 located on one of the destination items 1152, 1154 and 1156.

The up/down button 510L including the up button 511L and the down button 512L may be assigned to the first button 110L to select an item, and a button for selecting a specific item may be assigned to the second button 110R.

Figure 12A:
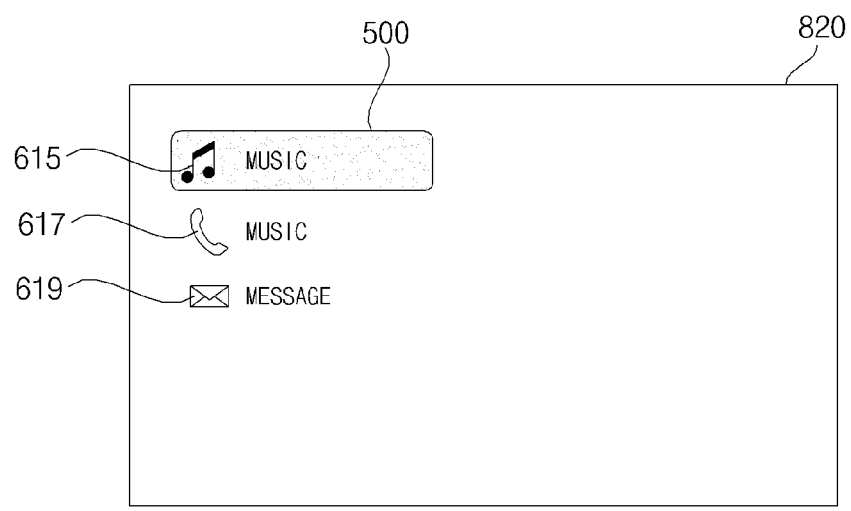
Figure 12A:
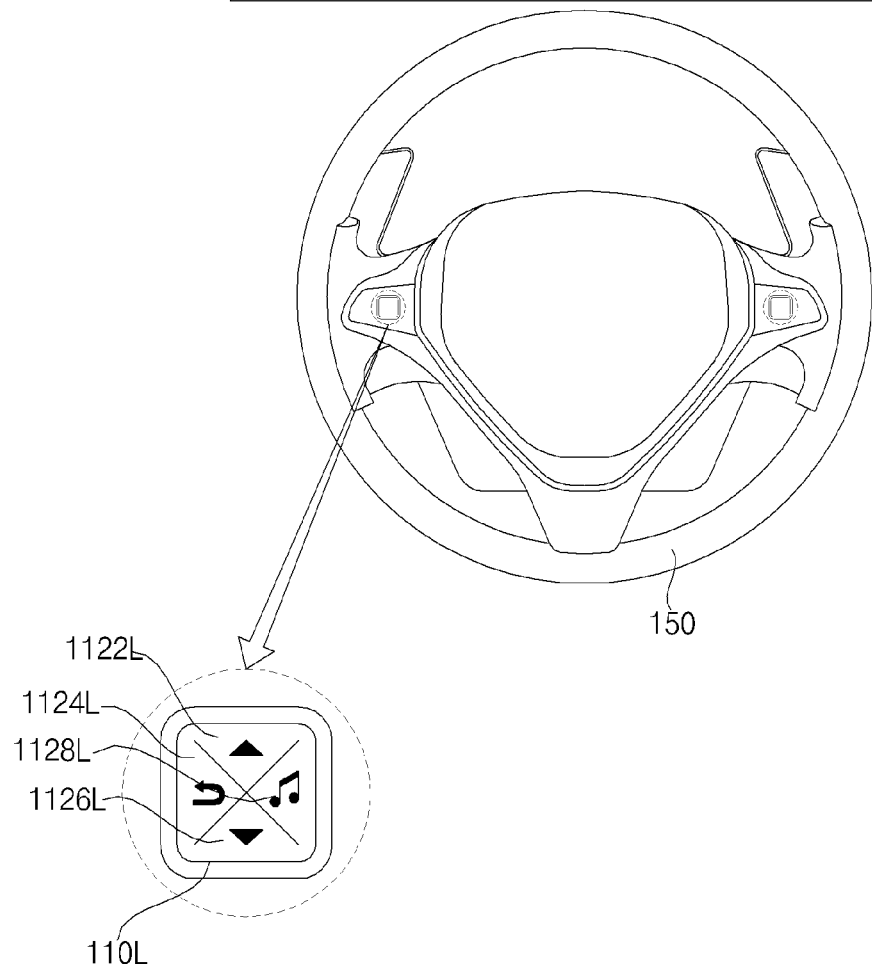
Figure 12B:
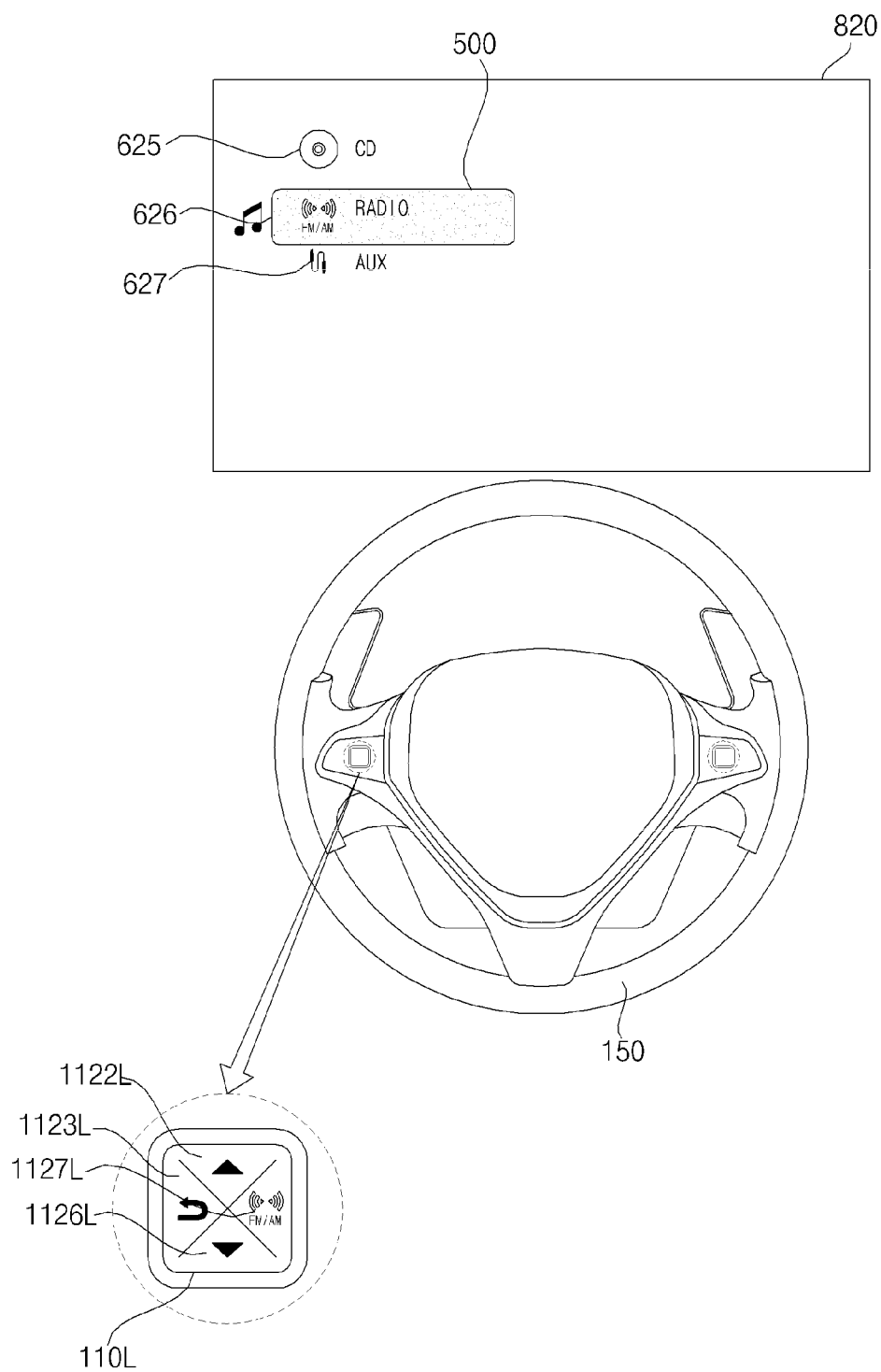

FIGS. 12A and 12B illustrate another example of the first button 110L.

FIGS. 12A and 12B are different from FIGS. 6A to 11B in that functions are assigned to the first button 110L only and are not assigned to the second button 110R.

FIG. 12A shows an example scenario in which an up button 1122L, a previous menu button 1124L, a down button 1126L, and a selection button 1128L are assigned to the first button 110L.

FIG. 12A shows an example scenario in which a music item 615, the phone item 617 and the message item 619 are displayed as menu items in the output area 820. FIG. 12A illustrates that the highlight bar 500 is located on the music item 615.

Accordingly, an image corresponding to the music item 615 may be displayed on the selection button 1128L.

If the user moves the highlight bar 500 downward using the down button 1126L, the image displayed on the selection button 1128L is changed.

If the user selects the selection button 1128L, a corresponding item is selected.

FIG. 12B illustrates that a media source is selected after the music item 615 is selected in FIG. 12A.

Although the assignment of the first button 110L is the same, FIG. 12B is different from FIG. 12A in that the CD item 625, the radio item 626, and the AUX item 627 are displayed in the output area 820.

FIG. 12B illustrates that the highlight bar 500 is located on the radio item 626. Accordingly, an image 1127L corresponding to the radio item 626 may be displayed on the selection button 1128L. If the user selects the selection button 1127L, a corresponding item is selected.

An input system disposed in a steering wheel of a vehicle, according to an implementation of the present disclosure, may be a dynamic human machine interface (HMI) the function of which is changed according to user manipulation, driving state of the vehicle, etc. To this end, the input system may include a plurality of buttons and at least one of the buttons may include a display portion to display an image corresponding to a function, and an operation portion for, if the image displayed on the display portion 310 is divided into a plurality of areas, performing an operation to differentiate at least one of the plurality of areas. As such, user convenience may be improved.

Specifically, the operation portion may include a plurality of bars disposed in at least two directions, and some of the bars may protrude to correspond to at least one of the plurality of areas if the image displayed on the display portion is divided into the areas, thereby allowing a user to intuit the touchable areas Since an image corresponding to a function is displayed on a separate display, the user may change to a desired function by viewing the display while driving the vehicle behind the steering wheel, and thus user convenience may be improved.

Specifically, since the user can find and execute various desired functions due to motion of a finger, e.g., a thumb, while the user is driving the vehicle, looking ahead, and holding the steering wheel, driving safety may be improved.

In addition, data communication with an external device inside the vehicle, e.g., a navigation device, may be performed via an interface, and thus a selection operation of the navigation device may be performed using an input button, thereby improving user convenience.

An input system disposed in a steering wheel and a vehicle including the same according to the present disclosure are not constrained to the exemplary implementations set forth herein. Therefore, variations and combinations of the exemplary implementations may fall within the scope of the present disclosure.

A method for operating an input system or a vehicle according to the present disclosure can also be embodied as processor-readable code on a processor-readable recording medium. The processor-readable recording medium is any data storage device that can store data which can thereafter be read by a processor included in the broadcast receiver apparatus. Examples of the processor-readable recording medium include read-only memory (ROM), random-access memory (RAM), CD-ROMs, magnetic tapes, floppy disks, and optical data storage devices. The processor-readable recording medium can also be distributed over network coupled computer systems so that the processor-readable code is stored and executed in a distributed fashion.

Although the above implementations of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An input system for a vehicle having a steering wheel, the input system comprising:
   an input unit comprising a plurality of buttons that are disposed in the steering wheel of the vehicle; and
   a processor configured to detect an event and to assign a function to at least one of the buttons that corresponds to the detected event,
   wherein at least one of the plurality of buttons comprises:
      a display portion configured to display an image corresponding to the assigned function, and
      an operation portion disposed under the display portion, the operation portion including a plurality of protruding members that are activatable,
   wherein at least one of the plurality of protruding members is configured, based on the image displayed on the display portion being divided into a plurality of areas that each display an item image corresponding to the assigned function, to be protruded upward relative to the other of the plurality of protruding members to thereby provide a tactile distinction between the plurality of areas,
   wherein the plurality of protruding members comprises a plurality of bars that extend in eight different directions corresponding to up, down, left, right, and four diagonal directions of the operation portion,
   wherein the plurality of bars is configured not to protrude from a surface of the operation portion based on the image displayed on the display portion corresponding to a single image that is not divided into the plurality of areas,
   wherein bars extending in the left and right directions from among the plurality of bars are configured to protrude from the surface of the operation portion based on the image displayed on the display portion being divided into the plurality of areas in the up and down directions, wherein bars extending in the up and down directions from among the plurality of bars are configured to protrude from the surface of the operation portion based on the image displayed on the display portion being divided into the plurality of areas in the left and right directions, and wherein bars extending in the four diagonal directions from among the plurality of bars are configured to protrude from the surface of the operation portion based on the image displayed on the display portion being divided into the plurality areas in up, down, left, and right directions.

2. The input system according to claim 1, wherein the protruding members are bar-shaped and oriented in at least two directions.

3. The input system according to claim 2, wherein the display portion is configured to pivot, based upon the protruding member being protruded, about a portion of the protruded protruding member.

4. The input system according to claim 1, wherein the operation portion is configured to sense touch input of a user in areas other than the portions that include the one or more protruding members.

5. The input system according to claim 2, wherein the operation portion further includes an actuator that is configured to actuate the at least one of the protruding members to the protruded position.

6. The input system according to claim 1, further comprising a display configured to display an image related to the function that is assigned to the button.

7. The input system according to claim 6, wherein, when the image displayed on the display portion is divided into the plurality of areas and touch input of a user is made in one of the areas, the processor controls the display to highlight the area corresponding to the touch input.

8. The input system according to claim 1, wherein the processor is configured, based on the image displayed on the display portion being divided into a plurality of areas, to correspondingly vary areas of the operation portion that can sense touch input of a user.

9. The input system according to claim 6, wherein the plurality of buttons includes a first button and a second button, and wherein the processor is configured to control to be performed:

the display portion of the first button to display a menu button;

the display portion of the first button to display images according to selection input of the menu button;

the display to display a menu screen;

a second button to display an image corresponding to a predetermined item of the menu screen if the up and down buttons displayed on the first button are operated; and an operation corresponding to an item selected via selection input of the second button.

10. The input system according to claim 6, wherein the plurality of buttons includes a first button that is configured to display a first four-direction button image in the display portion, and wherein the processor is configured to determine whether a finger of a user touches the first button, the display being configured to, based on the processor determining that the finger touched the first button, display an image corresponding to the first four-direction button.

11. The input system according to claim 10, wherein the plurality of buttons includes a second button that is configured to display a second four-direction button image in the display portion, and wherein the processor is configured to determine whether the finger of the user touches the second button, the display being configured to, based on the processor determining that the finger touched the second button, display an image corresponding to the second four-direction button.

12. The input system according to claim 1, further comprising an interface configured to exchange data with a navigation device inside the vehicle, wherein the processor is configured, based on a selective item being displayed on the navigation device, to receive information related to the selective item via the interface and to control at least one of the plurality of buttons to display an image for selecting the selective item.

13. The input system according to claim 1, wherein at least one of the protruding members are configured to remain fixed in a protruded state, based upon being activated, to correspondingly constrain the movement of the display portion relative to the operation portion.

14. The input system according to claim 13, wherein the display portion is configured to pivot, based upon the protruding member being in the protruded state, about a portion of the protruded protruding member.

15. A vehicle comprising:

wheels;

a steering wheel configured to control a direction of the vehicle; and an input system for a vehicle having a steering wheel, the input system comprising:

an input unit comprising a plurality of buttons that are disposed in the steering wheel of the vehicle, and a processor configured to detect an event and to assign a function to at least one of the buttons that corresponds to the detected event, wherein at least one of the plurality of buttons comprises:

a display portion configured to display an image corresponding to the function, and an operation portion disposed under the display portion, the operation portion including a plurality of protruding members that are activatable, wherein at least one of the plurality of protruding members is configured, based on the image displayed on the display portion being divided into a plurality of areas that each display an item image corresponding to the assigned function, to be protruded upward relative to the other of the plurality of protruding members to thereby provide a tactile distinction between the plurality of areas, wherein the plurality of protruding members include a plurality of bars that extend in eight different directions corresponding to up, down, left, right, and four diagonal directions of the operation portion, wherein the plurality of bars is configured not to protrude from a surface of the operation portion based on the image displayed on the display portion corresponding to a single image that is not divided into the plurality of areas, wherein bars extending in the left and right directions from among the plurality of bars are configured to protrude from the surface of the operation portion based on the image displayed on the display portion being divided into the plurality of areas in the up and down directions, wherein bars extending in the up and down directions from among the plurality of bars are configured to protrude from the surface of the operation portion based on the image displayed on the display portion being divided into the plurality of areas in the left and right directions, and wherein bars extending in the four diagonal directions from among the plurality of bars are configured to protrude from the surface of the operation portion based on the image displayed on the display portion being divided into the plurality areas in up, down, left, and right directions.

16. The vehicle according to claim 15, wherein the protruding members are bar-shaped and oriented in at least two directions.

17. The vehicle according to claim 15, further comprising a display configured to display an image related to the function that is assigned to the button.

18. The vehicle according to claim 15, further comprising an interface configured to exchange data with a navigation device inside the vehicle, wherein the processor is configured, based on a selective item being displayed on the navigation device, to receive information related to the selective item via the interface and to control at least one of the plurality of buttons to display an image for selecting the selective item.

19. A button comprising:
a display portion configured to display an image corresponding to a function that is assigned to the button; and
an operation portion disposed under the display portion, the operation portion including a plurality of protruding members that are activatable,
wherein at least one of the plurality of protruding members is configured, based on the image displayed on the display portion being divided into a plurality of areas that each display an item image corresponding to the assigned function, to be protruded upward relative to the other of the plurality of protruding members to thereby provide a tactile distinction between the plurality of areas,
wherein the plurality of protruding members include a plurality of bars that extend in eight different directions corresponding to up, down, left, right, and four diagonal directions of the operation portion,
wherein the plurality of bars is configured not to protrude from a surface of the operation portion based on the image displayed on the display portion corresponding to a single image that is not divided into the plurality of areas,
wherein bars extending in the left and right directions from among the plurality of bars are configured to protrude from the surface of the operation portion based on the image displayed on the display portion being divided into the plurality of areas in the up and down directions,
wherein bars extending in the up and down directions from among the plurality of bars are configured to protrude from the surface of the operation portion based on the image displayed on the display portion being divided into the plurality of areas in the left and right directions, and
wherein bars extending in the four diagonal directions from among the plurality of bars are configured to protrude from the surface of the operation portion based on the image displayed on the display portion being divided into the plurality areas in up, down, left, and right directions.

20. The button according to claim 19, wherein the protruding members are bar-shaped and oriented in at least two directions, and wherein the display portion is configured to pivot, based upon the protruding member being protruded, about a portion of the protruded protruding member.

* * * * *